(12) United States Patent
Nayfeh et al.

(10) Patent No.: US 8,347,944 B2
(45) Date of Patent: Jan. 8, 2013

(54) NANO-ENGINEERED ULTRA-CONDUCTIVE NANOCOMPOSITE COPPER WIRE

(75) Inventors: Taysir H. Nayfeh, Cleveland, OH (US); Anita M. Wiederholt, Sheffield Village, OH (US)

(73) Assignee: Cleveland State University, Cleveland, OH (US)

( * ) Notice: Subject to any disclaimer, the term of this patent is extended or adjusted under 35 U.S.C. 154(b) by 0 days.

(21) Appl. No.: 13/327,076

(22) Filed: Dec. 15, 2011

(65) Prior Publication Data
US 2012/0152480 A1   Jun. 21, 2012

Related U.S. Application Data

(60) Provisional application No. 61/424,218, filed on Dec. 17, 2010.

(51) Int. Cl.
*B22D 27/09* (2006.01)
*B22D 19/14* (2006.01)
(52) U.S. Cl. ............ 164/113; 164/91; 164/97; 164/119; 164/120
(58) Field of Classification Search .................. 164/91, 164/97, 113, 119, 120
See application file for complete search history.

(56) References Cited

U.S. PATENT DOCUMENTS

| 5,259,436 | A | 11/1993 | Yun et al. |
| 6,021,840 | A | 2/2000 | Colvin |
| 6,860,314 | B1 * | 3/2005 | Koide et al. ............ 164/113 |
| 7,712,512 | B2 * | 5/2010 | Suganuma et al. ......... 164/113 |
| 2005/0115693 | A1 | 6/2005 | Baumgartner |
| 2008/0067681 | A1 | 3/2008 | Tseng et al. |
| 2008/0210370 | A1 | 9/2008 | Smalley et al. |
| 2010/0068526 | A1 | 3/2010 | Adams et al. |
| 2010/0203351 | A1 | 8/2010 | Nayfeh |
| 2011/0068299 | A1 | 3/2011 | Hong et al. |
| 2011/0174519 | A1 | 7/2011 | Shah et al. |

OTHER PUBLICATIONS

PCT International Search Report and the Written Opinion of the International Searching Authority for International Application No. PCT/US 11/65191; Authorized Officer Lee W. Young; Date of Mailing Jun. 4, 2012; Date of Completion May 23, 2012, 16 pgs.
Cha et al., "Extraordinary Strengthening Effect of Carbon Nanotubes in Metal-Matrix Nanocomposites Processed by Molecular-Level Mixing" Adv. Mater. 2005, 17, pp. 1377-1381.

(Continued)

*Primary Examiner* — Kevin P Kerns
*Assistant Examiner* — Kevin E Yoon
(74) *Attorney, Agent, or Firm* — Fay Sharpe LLP

(57) ABSTRACT

Nano-composite structures are formed by pre-loading carbon nanotubes (CNTs) into at least one of a plurality of channels running the length of a cartridge, placing the pre-loaded cartridge in a piston chamber of a die-casting machine, creating a vacuum therein, and filing the piston chamber with molten metal to soak the pre-loaded cartridge and fill empty cartridge channels. Pressure is applied via the piston to eject the carbon nanotubes and molten metal from the cartridge channels and inject the nano-composite mixture into a rod-shaped die cavity. The internal diameter of the cavity is equal to or less than the final diameter of the nozzle. The nano-composite mixture is cooled to form a solid nano-composite rod having the first predetermined diameter, wherein the carbon nanotubes are aligned in a non-random manner. Furthermore, drawing down the nano-composite rod to smaller diameter wire further disperses the nanotubes along the length of the wire.

14 Claims, 32 Drawing Sheets
(23 of 32 Drawing Sheet(s) Filed in Color)

OTHER PUBLICATIONS

Collins et al., "Current Saturation and Electrical Breakdown in Multiwalled Carbon Nanotubes" The American Physical Society, vol. 86, No. 14, Apr. 2, 2001, pp. 3128-3131.

Collins et al., "Multishell conduction in multiwalled carbon nanotubes" Applied Physics A, Materials Science & Processing, A 74, (2002), pp. 329-332.

Hjortstam at al., "Can we achieve ultra-low resistivity in carbon nanotube-based metal composites?" Applied Physics A, Materials Science & Processing, A 78, (2004), pp. 1175-1179.

Li et al., "CNT reinforced light metal composites produced by melt stirring and by high pressure die casting" Composites Science and Technology 70 (2010), pp. 2242-2247.

Li et al., "Multichannel Ballistic Transport in Multiwall Carbon Nanotubes" Physical Review Letters, PRL 95, 086601 (2005) week ending Aug. 19, 2005, pp. 086601-1-086601-4.

Salimi at al., "Fabrication of an aluminum-carbon nanotube metal matrix composite by accumulative roll-bonding" J. Mater Sci (2011), 46:409-415.

Wilson et al., "Processing of Titanium Single-Walled Carbon Nanotube Metal-Matrix Composites by the Induction Melting Method" Journal of Composite Materials, vol. 44, No. Sep. 2010, pp. 1037-1048.

Zeng et al., "A new technique for dispersion of carbon nanotube in a metal melt" Materials Science and Engineering A, MSA-26156, (2010) 6 pgs.

Xu et al., "Continuous electrodeposition for lightweight, highly conducting and strong carbon nanotube-copper composite fibers" Nanoscale, 2011, 3, 4215-4219.

* cited by examiner

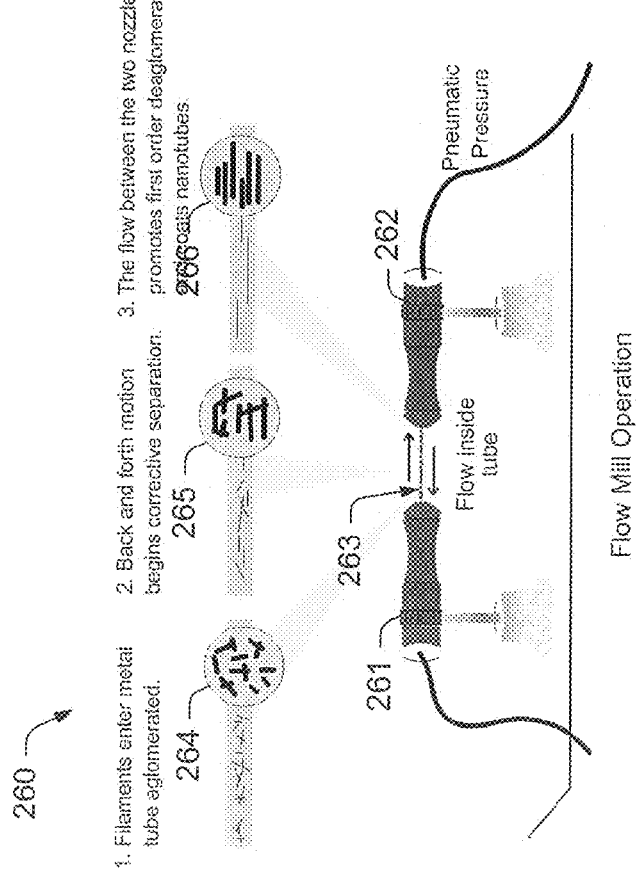

NANO-ENGINEERED ULTRA-CONDUCTIVE NANOCOMPOSITE COPPER WIRE

CROSS-REFERENCE TO RELATED APPLICATIONS

This application claims priority to U.S. Provisional Application Ser. No. 61/424,218, entitled NANO-ENGINEERED ULTRA-CONDUCTIVE NANOCOMPOSITE COPPER WIRE and filed on Dec. 17, 2010, the entirety of which is incorporated by reference herein.

The U.S. Government has a paid-up license in this invention and the right in limited circumstances to require the patent owner to license others on reasonable terms as provided for by the terms of Subcontract GTS-S-11-078 awarded by CERDEC-Army Power Div.

BACKGROUND OF THE INVENTION

This invention relates to a method and apparatus for manufacturing ultra-conductive and/or ultra-strong nano-composite wire. While the invention is particularly directed to the art of wire manufacture, and will be thus described with specific reference thereto, it will be appreciated that the invention will have usefulness in other fields and applications including the manufacturing of ultra-conductive and/or ultra-strong sheet metal, bars etc.

Since the discovery of electricity, pure metals were thought to have the lowest resistance to transporting electrical current at room temperature. This defined the upper limits of the efficiency and consequently the size and power consumption of all conventional electric machines and devices. Recently, the discovery of carbon nanotubes (CNTs) introduced a new class of metallic carbon nanotubes based conductors (known as ballistic conductors) that are orders of magnitude better at carrying current than pure metals. Unfortunately, harnessing this potential has not been successful thus far because the nanotubes produced to-date are on the order of few millimeters in length and no one has been able to make practical length segments and/or continuous bundles of wires with these properties. Other attempts at harnessing this potential by forming nano-composite metal/nanotubes matrices starting from powdered metals and/or by molecular level mixing failed to produce gains in the electrical conductivity.

The concept of ultra-low resistivity in copper and other metal nano-composites was theorized in 2004. A group of researchers from ABB Corporation and Stanford University proposed that it may be possible to fabricate carbon nanotubes (CNT)/copper composite materials with ultra-low electrical resistivity. To this end, they developed a theoretical model to estimate the possible gains in the conductivity versus the percent fill factor of the nanotubes in a copper nano-composite matrix. That model assumes ballistic conductance over the full length of single wall carbon nanotubes (SWCNTs) with the following nominal properties: mean length of 10 μm, mean diameter of 1.2 nm, resistance at room temperature of 18 KΩ/tube. This translates into a resistivity of 0.35 μΩ cm for the nanotubes in contrast to 1.67 μΩ cm for copper at room temperature. Based on the model and the properties of the nanotubes they selected, the authors concluded that it is possible to achieve ultra-low resistivity/or a doubling of the conductivity with a 30-40% fill factor of nanotubes. They further concluded that in order to realize these gains, a manufacturing process that is capable of producing the nano-composite matrix would need to be developed. And although the technical challenges that would have to be overcome by the manufacturing process were not identified or discussed in that paper, the authors remarked that at a minimum, the nanotubes would need to be well dispersed, preferably aligned, and well contacted within the matrix. In addition, because copper will not wet the carbon nanotubes (i.e., will not form good electrical contacts with the nanotubes), the authors proposed to aid the process by coating the nanotubes with a coating from a list of materials that are non-carbide forming and thus are suitable for forming low contact resistance between them.

The present invention contemplates new and improved systems and methods that resolve the above-referenced difficulties and others.

SUMMARY OF THE INVENTION

In one aspect of the invention, a method of forming nano-composite copper wire comprises preloading carbon nanotubes into at least one of a plurality of channels running a length of a cartridge, placing the pre-loaded cartridge in a piston chamber of a die-casting machine, and drawing air out of the piston chamber to create a vacuum therein. The method further comprises filing the piston chamber with molten metal and soaking the pre-loaded cartridge for a predetermined time, wherein the molten metal fills cartridge channels that are not pre-loaded with carbon nanotubes. Additionally, the method comprises applying pressure via the piston to eject the carbon nanotubes and molten metal from the cartridge channels as a nano-composite mixture and inject the nano-composite mixture into a rod-shaped die cavity through a nozzle that draws down the nano-composite mixture to a first predetermined diameter that is not greater than a diameter of the die cavity. Furthermore, the method comprises cooling the nano-composite mixture to form a solid nano-composite rod having the first predetermined diameter, wherein the carbon nanotubes are aligned in a non-random manner in the nano-composite rod.

According to another aspect, a method of forming nano-composite copper wire comprises loading a piston chamber with a carbon nanotube (CNT) precursor, injecting the CNT precursor into a molten metal stream that is under pressure and traveling at high velocity into a die cavity to form a nano-composite mixture, and forcing the nano-composite mixture through a nozzle and into the die cavity, which has an internal diameter equal to or less than a diameter of the nozzle exit. The method further comprises cooling the nano-composite mixture to form a solid nano-composite rod having the first predetermined diameter, wherein the carbon nanotubes are aligned in a non-random manner in the nano-composite rod. The nano-composite mixture experiences turbulent flow that mixes the CNT precursor material into the molten metal followed by laminar flow that aligns CNT filaments with each other. The nozzle exerts shear forces on the nano-composite mixture to further align the CNT filaments in the molten metal.

According to another embodiment, a method of forming carbon nanotube (CNT) precursor material for adding to molten metal to form a nano-composite material comprises ball-milling commercial type CNTs to break the CNTs down to a predetermined length, and graphitizing the shortened CNTs by heating to a predetermined temperature. The method further comprises ultrasonically mixing the graphitized CNTs with an $MgCl_2$ solution, and flow-milling the CNTs with the $MgCl_2$ solution for a predetermined number of milling cycles.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 12A illustrates a CNT precursor generation system that comprises a pair of pneumatic guns that are coupled to a tube into which is placed CNT material and magnesium chloride ($MgCl_2$).

FIG. 12B is a photograph of precursor CNT material being preloaded into a cartridge for use in the described systems and methods.

DETAILED DESCRIPTION

Figure 1:
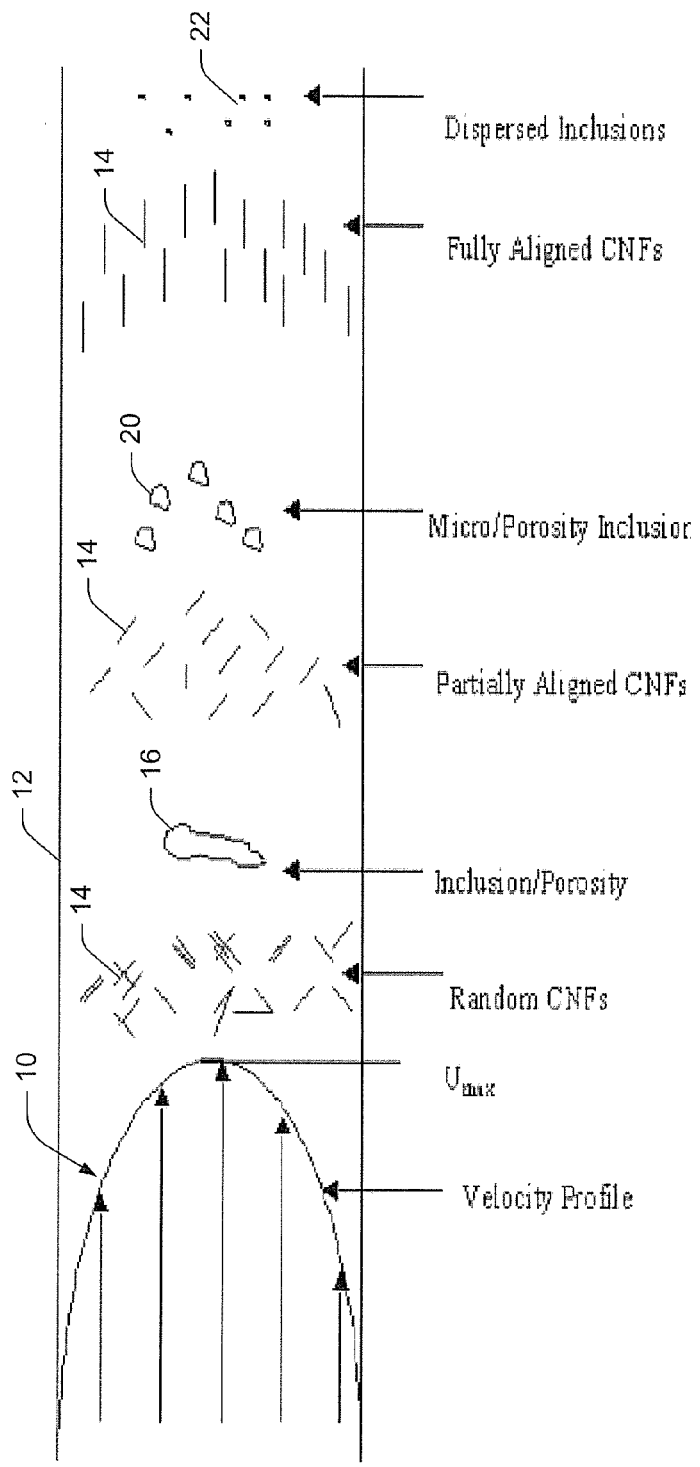
FIG. 1 illustrates a technique for generating nano-composite copper wire.

Referring now to the drawings wherein the showings are for purposes of illustrating the exemplary embodiments only and not for purposes of limiting the claimed subject matter. FIG. 1 illustrates a technique for generating nano-composite copper wire. In order to overcome the above-described obstacles, two main issues need to be addressed, which are: first, identifying and/or developing a manufacturing process that is capable of infusing, dispersing, and aligning carbon nanotubes in copper while minimizing the residual porosity in the matrix in order to form intimate electrical contacts; and second, identifying a type of nanotube that acts as a ballistic conductor and identifying a coating material such that the combination is suited for infusing into copper and has the potential for functioning in unison with copper to form a semi-bulk ballistic conductor, and thus produce the desired ultra-conductivity.

With these properties in mind, whether the copper is powder or molten when mixed with the nanotubes, the nano-composite mixture can be melted and flowed initially in a turbulent fashion, followed by a region of laminar flow that aligns the nanotubes. These processing steps facilitate breaking up agglomerations of nanotubes, dispersing the nanotubes in the molten copper, aligning the nanotubes in the direction of the flow, and finally facilitate the growth of grain structure around the nanotubes under high pressure in order to achieve intimate electrical contact between the nanotubes and the copper.

Accordingly, in FIG. 1, a velocity profile 10 is shown for molten copper moving through a die 12, with randomly-oriented carbon nanofibers (CNFs) 14. The velocity profile has a maximum velocity. $V_{max}$, away from the edges of the die, and smaller velocity along the edges of the die. Also illustrated is a large inclusion 16, which is to be broken down into smaller, less detrimental inclusions using the described techniques. As the molten copper flows through the die, the CNFs 14 become partially aligned and the inclusion is broken down into micro-inclusions or micro-porosities 18. Continued flow of the copper through the die fully aligns the CNFs (also called carbon nanotubes or CNTs herein), and further breaks down and disperses the inclusions so that the nano-inclusions 20 are dispersed sufficiently to ensure that their impact on the structural and/or electrical properties of the wire is reduced to a predetermined acceptable level.

Mixing non-alloying two-phase materials such as molten copper and carbon nanotubes presents a challenging problem in that the two do not mix because of the buoyancy of the nanotubes in molten copper due to the huge mismatch between their densities. The density of the nanotubes is near 1.2 g/cc and they are hollow and filled with vacuum or inert gas. The density of molten copper is near 7.955 g/cc and has extremely low viscosity. As such, once in the molten state and if the mixture is static, the nanotubes near instantaneously lose alignment, segregate from the mixture, and re-agglomerate on top of the molten copper. This phenomenon further narrows the list of processes that may be used for forming the nano-composite copper wire. Regardless of how the constituents are mixed, in dry powders form or in the molten state, once melted, it is desirable that the mixture be continuously and vigorously stirred until it is back in the frozen state i.e., the temperature of the nano-composite is below the melting temperature of copper (approximately 1080° C.).

In order to meet all of the above-outlined constraints, a die-casting is used in the described systems and methods. Die casting is an ultra-fast manufacturing process where molten metal is ladled into a shot chamber and a piston quickly moves forward to close the chamber and force the melt into a cold die chamber under high pressure. Once the die is filled, the part is held under high pressure for few seconds until it freezes, at which point the die is opened and the part is ejected.

In one embodiment, in order to prevent oxidation or burning of the nanotubes, the entire process is performed in an inert atmosphere since the process temperature is near 1450° C. and the nanotubes oxidize at around 400° C. To this end, the nanotubes can be wrapped under inert conditions in 25 μm thick copper foil and pre-staged in the shot chamber of the die-casting machine. The molten copper is then ladled in and as a result, the copper packet floats on top of the molten copper and simultaneously, the bottom layer of the copper foil rapidly melts leaving the top layer intact until the piston moves forward to close the chamber and creates turbulence in the flow. In this manner, the nanotubes are contained in the shot chamber and protected from exposure to the atmosphere.

In another embodiment, the herein-described nano-composite copper/nanotubes wire exhibits over 10 fold higher electrical conductivity at room temperature than pure copper. The wire is produced by co-feeding and infusing coated (e.g., with $MgCl_2$ or some other coating) CNT pre-cursers into molten 101 copper, die casting the mixture into bars and quickly freezing the bars in order to maintain the position and alignment of the nanotubes. This process results in forming intimate electrical contacts between the nanotubes and copper, which enables some of the nanotubes to behave as ballistic conductors and in turn acted in unison with the copper to form a nano-composite with semi-bulk ballistic conductance (BBC) properties that produced the ultra-conductive wire.

In another embodiment, the wire is produced by infusing coated, metallic, 75-200 nm diameter, 10-15 μm long. MWCNT fibers into molten 101 copper, die casting the molten mixture into bars and quickly freezing the bars in order to maintain the position and orientation of the nanotubes in the matrix. The bars are cold rolled into rods and drawn into 3.2 mm diameter wire (or some other suitable or desired diameter). The combination of the coating and the high-pressure die casting process results in intimate electrical contact between the nanotubes and copper, which enables some of the nanotubes to behave as individual ballistic conductors. Thus, individual ballistic conductors are "stitched together" by the copper to form a nano-composite matrix with Bulk Ballistic Conductance "BBC" properties with increased electrical conductivity relative to commercial grade copper wire.

Higher conductivity copper wire and potentially other metal-based nano-composite wire improves the weight/power performance of electric motors, reduces the size and weight of motors and reduces losses in electrical power lines. Therefore, the herein-described nano-composite wire is useful in high performance, light electrical motors for use in aircrafts, electric cars, electric submarines, and all other modes of transportation that are weight, size, and heat dissipation sensitive.

Figure 2:
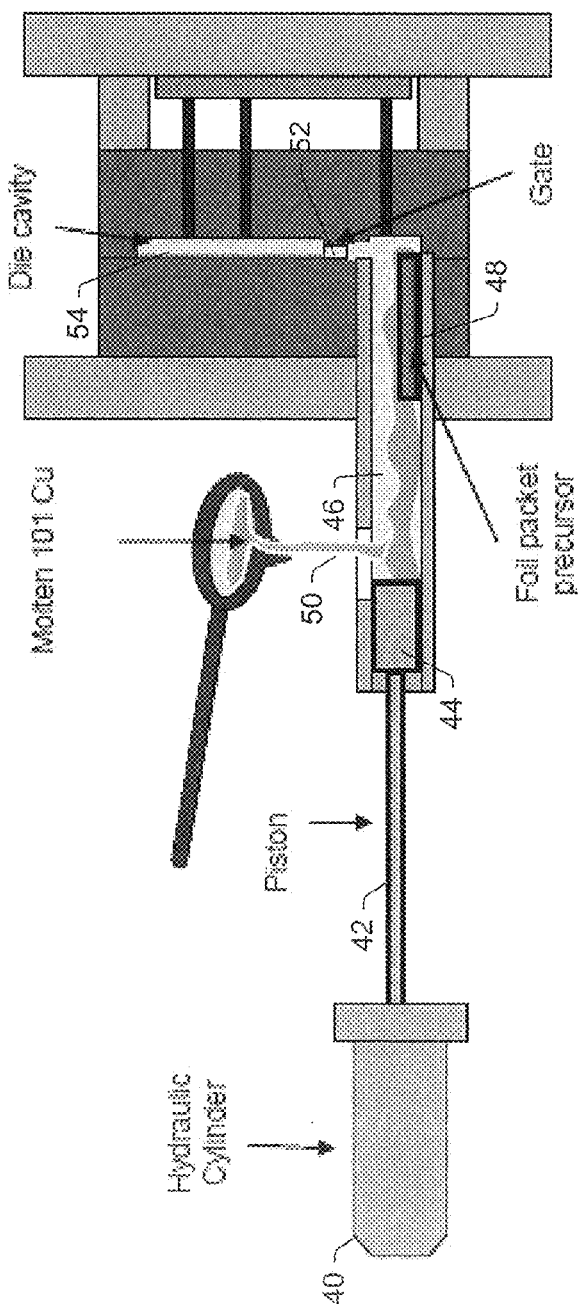
FIG. 2 illustrates a schematic representation of the die-casting system that is capable of protecting, infusing, reasonably dispersing, and aligning nanotubes in a copper matrix.

FIG. 2 illustrates a schematic representation of the die-casting system that is capable of protecting, infusing, reasonably dispersing, and aligning nanotubes in a copper matrix. The system includes a hydraulic cylinder 40 that drives a piston 42 with a piston head 44 into a shot chamber 46 containing a foil packet precursor 48 (e.g., CNTs wrapped in copper foil) as molten copper 50 fills the shot chamber. As pressure in the shot chamber increases due to the application of the piston head, the copper-CNT mixture is forced through a gate 52 into a die cavity 54 in which the copper-CNT mixture is permitted to cool, thereby forming a solid.

Figure 3B:
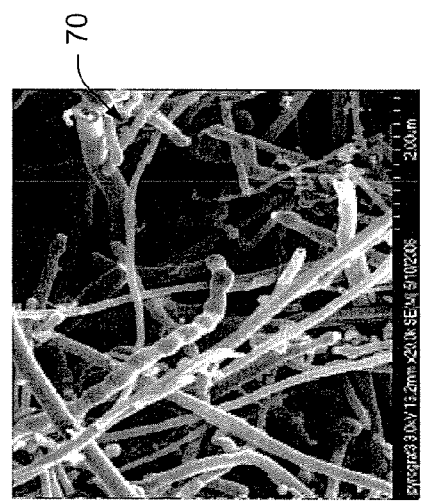
FIG. 3B shows the nanotubes in a random orientation at a higher resolution.
Figure 3A:
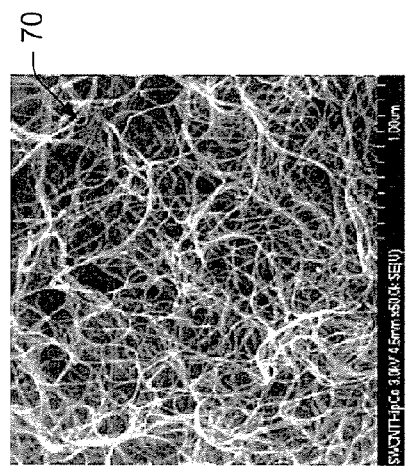
FIG. 3A shows a plurality of nanotubes in a random orientation at a first resolution.

FIGS. 3A-3B show several images of the nanotubes and copper wire formed therewith. FIG. 3A shows a plurality of nanotubes 70 in a random orientation at a first resolution. FIG. 3B shows the nanotubes 70 in a random orientation at a higher resolution. In one embodiment, the nanotubes are metallic, multiwall, carbon nanotubes (MWCNTs), with a bamboo-type architecture. Multi-wall nanotubes can withstand a greater amount of damage, such as may occur during mixing, heating, etc., than single wall nanotubes. In one embodiment, the nanotubes are grown via a chemical vapour deposition process (CVD) and have a mean length as grown of 200-300 μm, an average outer diameter in the range of 90-200 nm and a wall thickness of approximately 15 nm. The number of walls varies from 40-50 depending on the individual nanotube. Because of their large diameter and length, these nanotubes are also nanofibers. The nanotubes are graphitized by heat-treatment under inert conditions at approximately 3000° C.

In order to shorten the nanotubes to an average length of 10-15 μm and also to open them at both ends, the nanotubes are later broken-up by ball milling. This average length is consistent with predicted range for the average mean free path of electrons over which they are expected to maintain ballistic conductance in nanotubes and also has the potential of breaking the nanotubes at the defect points thus leaving more continuous, better ballistically conducting nanotubes. Opening the nanotubes at both ends facilitates the potential to develop full contacts with most of the individual walls of the nanotubes and thus creating multiple paths for potential ballistic conductance. The individual walls of the nanotubes run between the exterior and interior of the tubes. Therefore, rather than having to establish electrical contacts with the top and bottom ends of the nanotubes, the structure of these nanotubes permit electrical connections along the length of the individual walls of the inner and outer layers. To this end, since the internal diameters of the nanotubes are relatively large, in the range of 60-170 nm and because they are open on both ends, this feature permits the coating material and/or the molten copper to fill the nanotubes and thus establish electrical contacts between the interior and exterior ends of the layers and the rest of the copper matrix.

Traditionally, surfactants and dispersing agents are used to improve the dispersion of nanotubes in polymer nano-composites. Furthermore, the nanotubes are generally coated with some type of a material that will help establish better bond between the nanotubes and the matrix. However, these types of surfactants and/or dispersing agents may behave as an impurity that serves to impede the establishment of good electrical contacts between the nanotubes and the copper. Furthermore, pure metals have the highest electrical conductivity and as such, these impurities reduce the conductivity on their own regardless of the nanotubes and even if the impurity were of a more conductive material such as silver.

In one embodiment, a solution of Magnesium Chloride ($MgCl_2$) is used to help break-up large agglomerations and to coat the nanotubes in the process of preparing the pre-cursor coupons. $MgCl_2$ behaves as an impurity in the copper matrix. However, because of the high conductivity of magnesium (approximately 40% that of copper) and because of the lower melting point of 714° C. and a vaporization point of 1412° C. the $MgCl_2$ penetrates into the nanotubes and coats the interior and the exterior of the nanotubes when melted and vaporized by the addition of molten copper at 1450° C. and is alloyed with the copper to form intimate electrical contacts.

One of added benefits of using large diameter short nanotubes is that they are much easier to disperse. The Van Der Walls forces that exist between the individual nanotubes bind them together and make them difficult to disperse. The effect of this force becomes larger as the diameter of the nanotubes decreases and the nanotubes become much closer together. Also, as the length of the nanotubes and their tortuosity increases, the risk of entanglement increases dramatically and increases agglomeration.

In one experiment, multiple samples of nano-composite copper bar and rod billets were produced with varying degrees of nanotube concentration, distribution and uniformity. The mechanical integrity of the billets varied as a function of the concentration and distribution of the nanotubes and consolidation of the matrix during the final phase of the die casting process. Depending on their mechanical integrity, the less consolidated billets were cold rolled and swaged several times until formed into 3.2 mm diameter wire directly. The others with better mechanical integrity were also cold rolled and swaged however; they were formed into 3.2 mm diameter wire by a wire drawing operation rather than through continued swaging. Still, in several cases, inclusions in the billets as a result of large nanotube agglomerations and/or voids caused several breakages during the wire drawing operation and resulted in the production of wire segments ranging from 25-300 cm in length.

Figure 4:
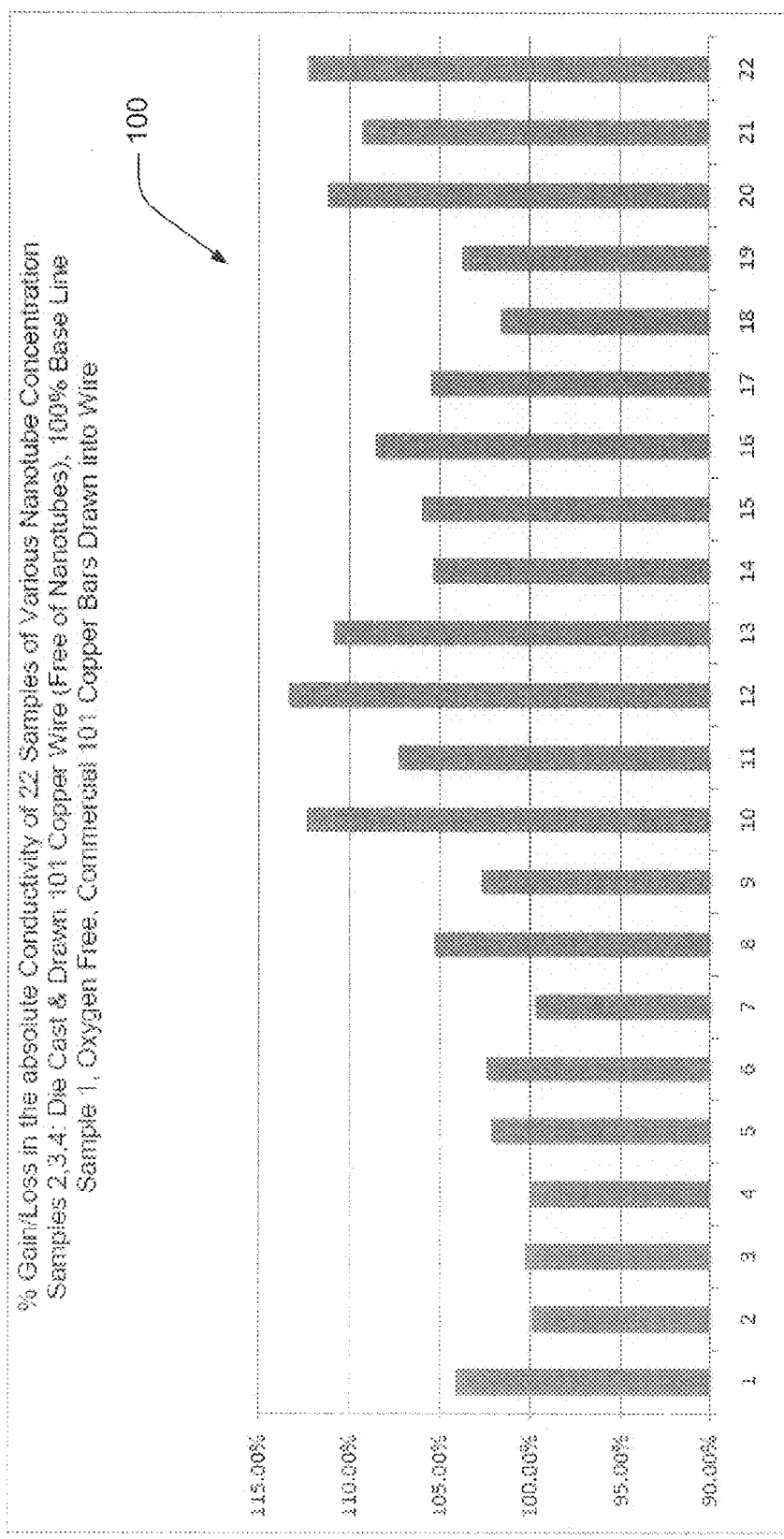
FIG. 4 shows a graph of gain and loss in conductivity of 22 samples of die cast copper wire with nanotubes.

FIG. 4 shows a graph 100 of gain and loss in conductivity of 22 samples of die cast copper wire with nanotubes. As shown, conductivity ranges between approximately 99% and 113% as compared to an expected conductivity (100%) for pure copper. Sample 1 is oxygen free, commercial 101 copper bars drawn into wire, and shows a conductivity of 104%. Samples 2-4 are of dies cast copper without nanotubes and show conductivity of approximately 100%. The remaining samples have various different nanotube concentrations, and have a substantially higher average conductivity than the oxygen free commercial 101 copper.

Figure 5:
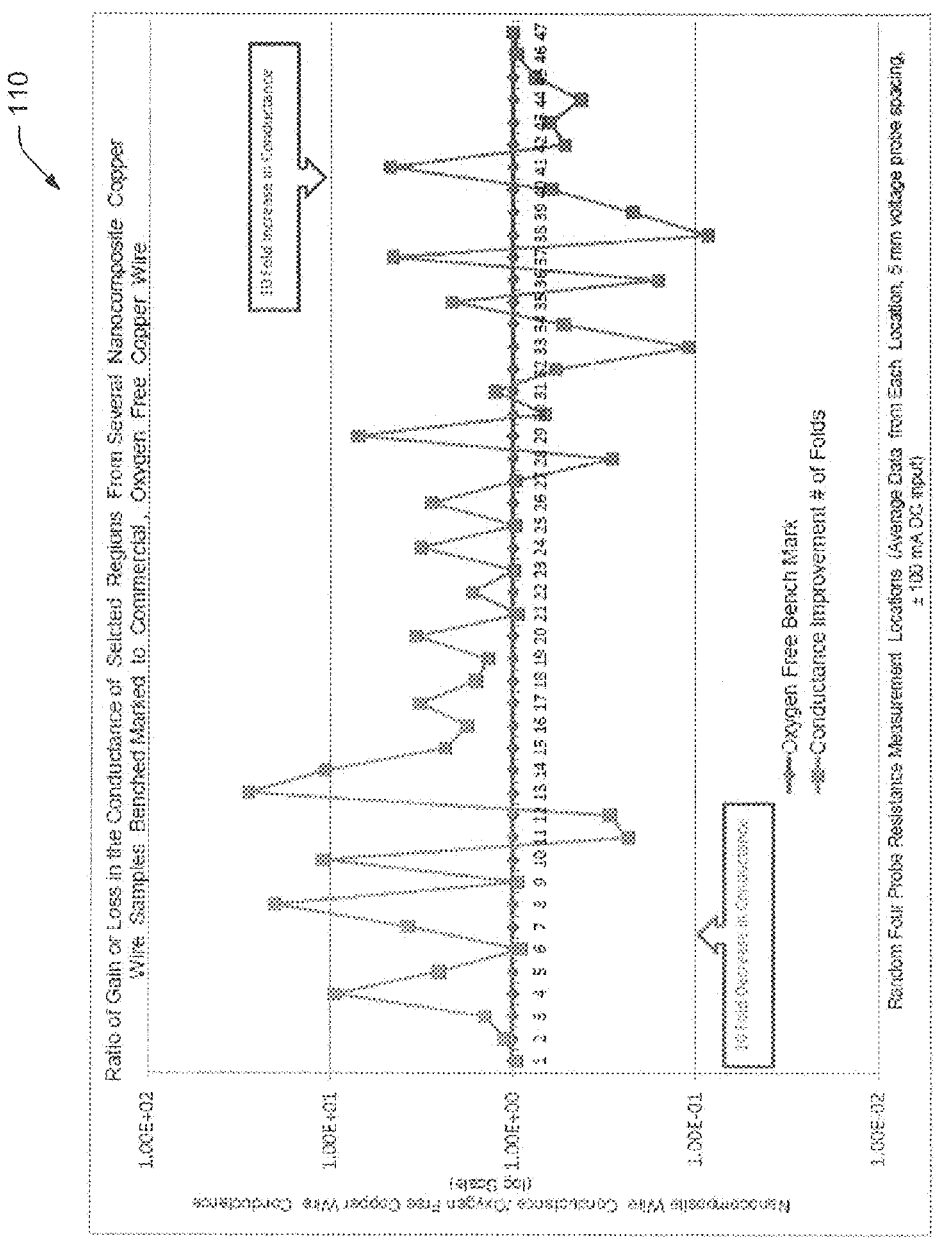
FIG. 5 illustrates a graph showing a ratio of gain or loss in conductance of 47 samples of copper wire with nanotubes, as compared to a benchmark (1.00) conductance for commercial oxygen free copper wire in 1 mm intervals.

FIG. 5 illustrates a graph 110 showing a ratio of gain or loss in conductance of 47 samples of copper wire with nanotubes, as compared to a benchmark (1.00) conductance for commercial oxygen free copper wire. The measurements were taken using random four-probe resistance measurement locations.

Figure 6:
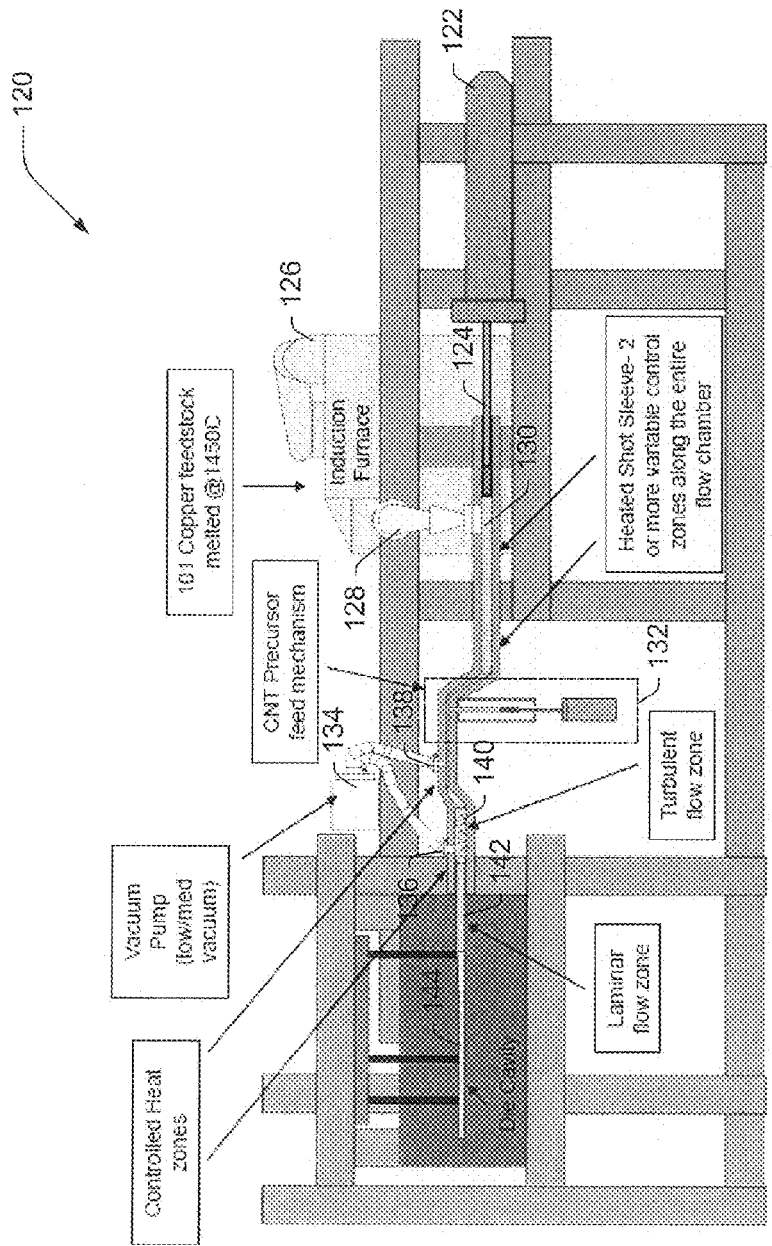
FIG. 6 illustrates a die casting system that facilitates forming the herein described nano-composite wire.

FIG. 6 illustrates a die casting system 120 that facilitates forming the herein described nano-composite wire. The system includes a hydraulic cylinder 122 that drives a piston 124. 101 copper feedstock is fed into an induction furnace 126 and melted at approximately 1450° C. Molten copper 128 is then poured into a heated shot sleeve 130 having two or more variable control heat zones, and forced by the piston past a carbon nanotube precursor feed mechanism 132 that feeds the nanotubes into the molten copper. The system also includes a vacuum pump 134 that controls two or more heating zones 136, 138. The copper nanotube mixture is then further forced past two or more additional heat-controlled zones 136, 138 along a turbulent flow zone 140, where the mixture is agitated to disperse the nanotubes in the copper and break down any agglomerations. After the turbulent flow zone is a laminar flow zone 142 wherein the mixture experiences a laminar flow (as described in U.S. patent application Ser. No. 12/303,612, which is hereby incorporated by reference herein in its entirety) that aligns the carbon nanotubes. Once the nanotubes are aligned, the mixture enters a die cavity 144 where it is cooled into a solid state.

Figure 7:
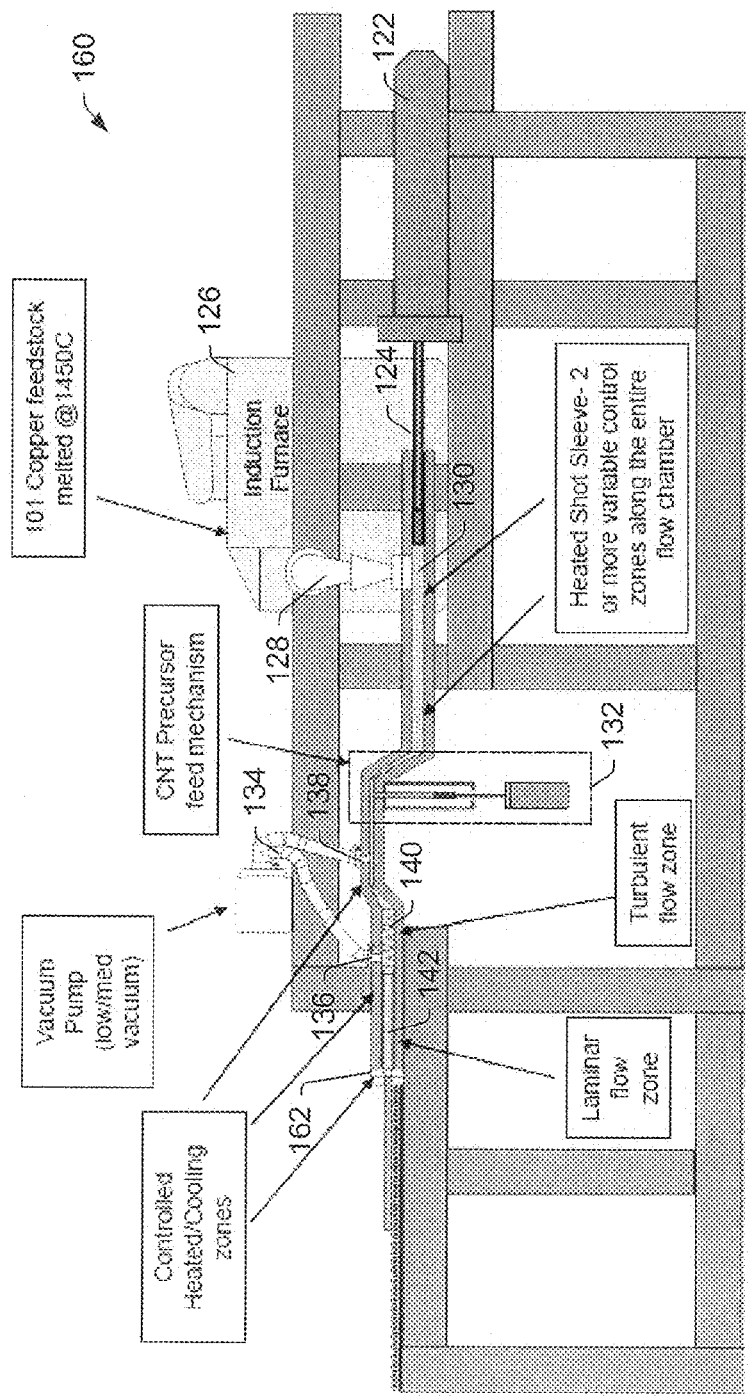
FIG. 7 illustrates a continuous nano-composite wire-forming system that facilitates forming the herein described nano-composite wire.

FIG. 7 illustrates a continuous nano-composite wire forming system 160 that facilitates forming the herein described nano-composite wire. The system includes a hydraulic cylinder 122 that drives a piston 124. 101 copper feedstock is fed into an induction furnace 126 and melted at approximately 1450° C. Molten copper 128 is then poured into a heated shot sleeve 130 having two or more variable control heat zones, and forced by the piston past a carbon nanotube precursor feed mechanism 132 that feeds the nanotubes into the molten copper. The system also includes a vacuum pump 134 that controls two or more heating zones 136, 138. The copper nanotube mixture is further forced past the two or more additional heat-controlled zones 136, 138 along a turbulent flow zone 140, where the mixture is agitated to disperse the nanotubes in the copper and break down any agglomerations. After the turbulent flow zone is a laminar flow zone 142 wherein the mixture experiences a laminar flow that aligns the carbon nanotubes. Once the nanotubes are aligned, the mixture passes out of the laminar flow zone and cooled until it achieves a solid state. In one embodiment, the system further includes a controlled cooling zone 62 that cools the mixture at or near the exit point of the system.

Figure 8:
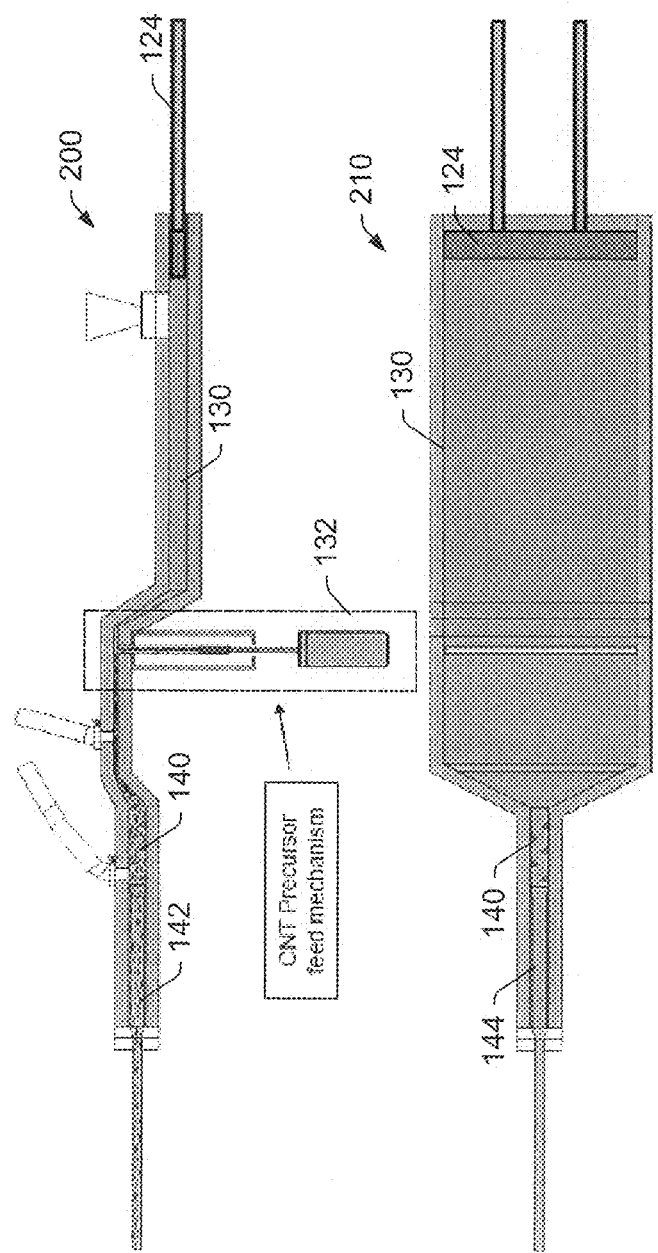
FIG. 8 illustrates a side view, and a top view, of a flow channel that is used in conjunction with the die casting system and/or the wire-forming system.

FIG. 8 illustrates a side view 200, and a top view 210, of a flow channel that is used in conjunction with the die casting system 120 and/or the wire-forming system 160. As illustrated, the flow channel includes the shot sleeve 130 through which molten copper is forced by the piston 124 past the precursor feed mechanism 132, through the turbulent flow zone 140 and the laminar flow zone. It will be understood that the flow channel may further include any or all of the other components described with regard to the systems of FIGS. 6 and 7.

Figure 9:
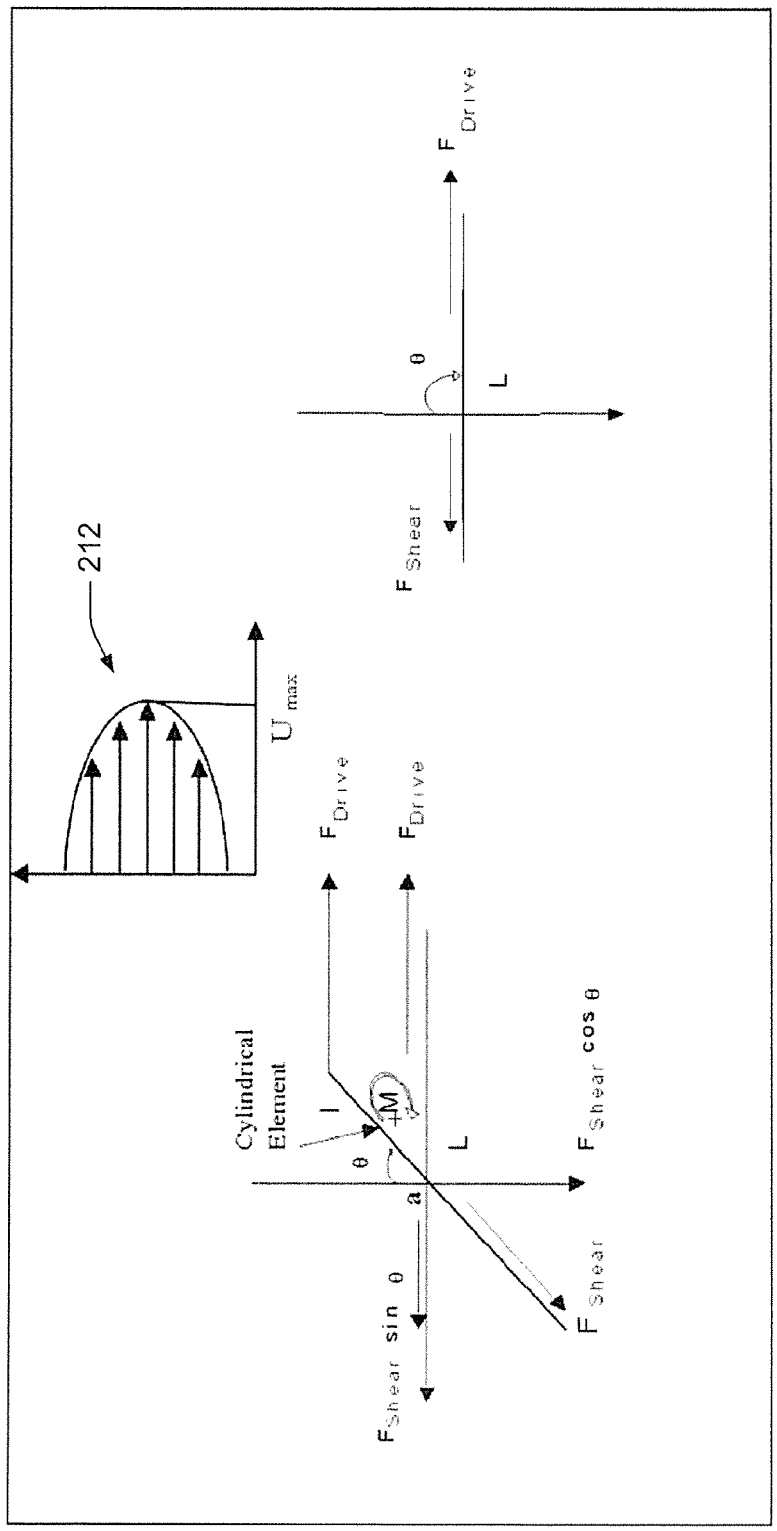
FIG. 9 shows shear and drive forces associated with the velocity profile of the molten copper-nanotube mixture through the laminar flow region.

FIG. 9 shows shear and drive forces associated with the velocity profile 212 of the molten copper-nanotube mixture through the laminar flow region of the systems of FIGS. 6 and 7.

Figure 10:
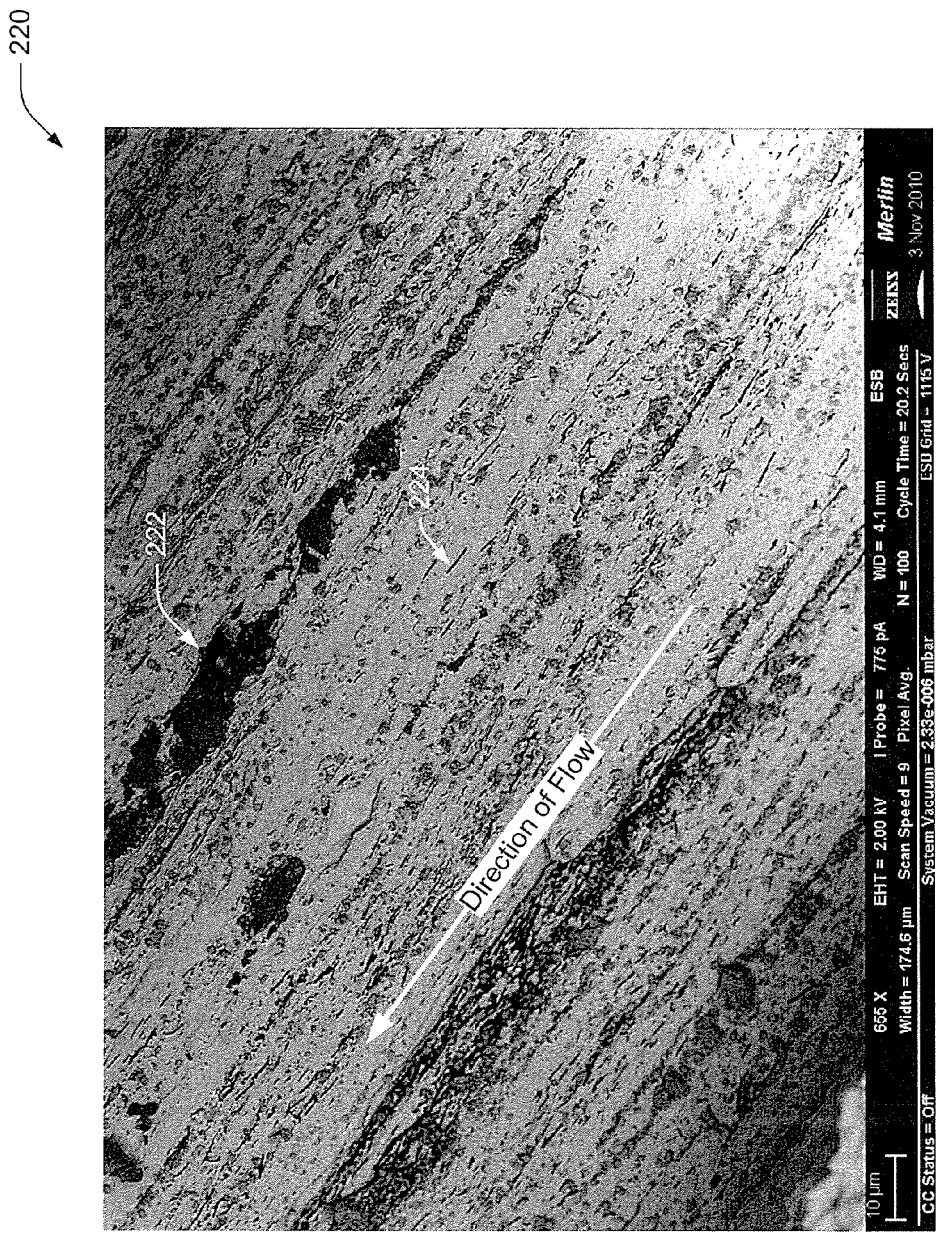
FIG. 10 shows an electron microscope image of the nano-composite mixture after freeze-fracturing a nano composite wire segment.

FIG. 10 shows an electron microscope image 220 of the nano-composite mixture after freeze-fracturing a nano composite wire segment. In the image, a CNT agglomeration 222 is visible. CNT agglomerations such as this mitigated by the presently-described systems and methods by subjecting the mixture to turbulent flow for a predetermined time period under predetermined conditions (e.g. pressure, temperature, velocity, etc.). Also visible are dispersed and properly oriented CNTs 224. Dispersion and orientation of the CNTs along a direction of flow of the mixture is achieved by subjecting the mixture to laminar flow for a predetermined time period under predetermined conditions (e.g. pressure, temperature, velocity, etc.).

Figure 11:
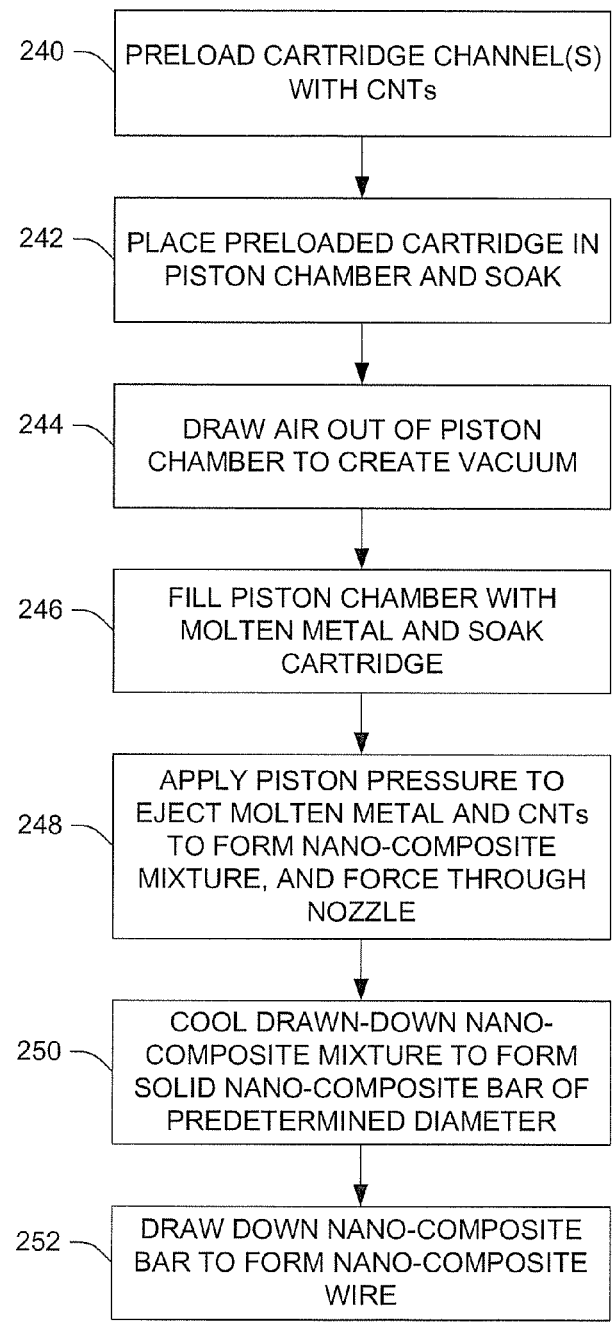
FIG. 11 illustrates a method of forming nano-composite wire comprising non-randomly aligned CNTs embedded in a metal wire, in accordance with various aspects described herein.

FIG. 11 illustrates a method of forming nano-composite wire comprising non-randomly aligned CNTs embedded in a metal wire, in accordance with various aspects described herein. The method may be performed in conjunction with any of the aspects, features, systems, etc., described herein. At 240, a cartridge comprising a plurality of channels is preloaded with CNTs. In one embodiment, the CNTs are tens of microns long (e.g., 10-15 μm, or some other predetermined length), which facilitates improving conductivity in the nano-composite material. In another embodiment, the CNTs are hundreds of microns long (e.g., 100-300 μm or some other predetermined length), which facilitates improving strength of the nano-composite material. The CNTs are placed into one or more of the cartridge channels, with a number of cartridge channels remaining empty. At 242, the preloaded cartridge is placed in a piston chamber having an interior diameter approximately equal to an exterior diameter of the cartridge so that the cartridge fits snuggly into the piston chamber. Additionally, a nozzle is placed into the piston chamber downstream of the cartridge, wherein the nozzle focuses and draws down a diameter of the nano-composite mixture expelled for the cartridge when the piston applies force in the piston chamber.

At 244, air is drawn out of the piston chamber to form a vacuum therein to prevent oxidation of the CNTs when molten metal is introduced into the piston chamber. At 246, the piston chamber is filled with molten metal. The preloaded cartridge is permitted to soak and the molten metal fills cartridge channels that are not preloaded with CNTs. At 248, pressure is applied in the piston chamber via the piston to eject the CNTs and molten metal from the cartridge channels as a nano-composite mixture, and forced through a nozzle that draws down the nano-composite mixture from the diameter of the piston chamber to a first predetermined diameter. At 250, the nano-composite mixture is cooled to form a solid nano-composite bar having the first predetermined diameter, wherein the carbon nanotubes are aligned in a non-random manner in the nano-composite bar. At 252, the nano-composite bar is further drawn down to form nano-composite wire of a second predetermined diameter (e.g., 100 μm or greater).

In one embodiment, the CNTs are multi-walled carbon nanotubes. The multi-walled carbon nanotubes can have a diameter in the range of 75-200 nm and a length in the range of 10-15 μm. In another embodiment, the multi-walled carbon nanotubes have a diameter in the range of 75-200 nm and a length in the range of 200-300 μm. In another embodiment, the multi-walled CNTs can be pre-coated in magnesium chloride. In another embodiment, the metal is 101 copper.

According to an example, the first predetermined diameter is approximately 12 mm. The cartridge has a diameter in the range of 15 mm to 30 cm, and the channels have a diameter in the range of 1 mm to 12 mm. In a related example, the channels have a diameter of approximately 3 mm or ⅛ inch. The cartridge is formed of a material (e.g., ceramic or the like or some other suitable material) that remains solid above a melting temperature of the molten metal.

According to another embodiment, the nano-composite wire and/or the nano-composite bar from which the wire is formed can be melted under mechanical pressure to form a nano-composite sheet or other aggregate nano-composite structure or shape (e.g., bar, ring, etc.), which is a function of the shape and size of the die cavity. This feature is described in greater detail with regard to FIG. 24.

FIG. 12A illustrates a CNT precursor generation system 260 that comprises a pair of pneumatic pumps or guns 261, 262 that are coupled to a tube 263 into which is placed CNT material and magnesium chloride ($MgCl_2$). At 264, CNT in the metal tube 263 are agglomerated. At 265, back-and-forth motion in the tube 263 caused by the pneumatic pressure applied by the guns 261, 262 causes the CNT material to begin to separate. At 266, flow between the pneumatic guns promotes first order deagglomeration and $MgCl_2$ coating of the CNTs. A CNT precursor material generation method is described in greater detail with regard to FIG. 31.

FIG. 12B is a photograph of precursor CNT material 268 being preloaded into a cartridge 270 for use in the described systems and methods. In one embodiment, CNTs are loaded into non-contiguous cartridge channels so that when ejected from the cartridge, the CNT filaments are jacketed or otherwise surrounded by molten metal.

Figure 12C:
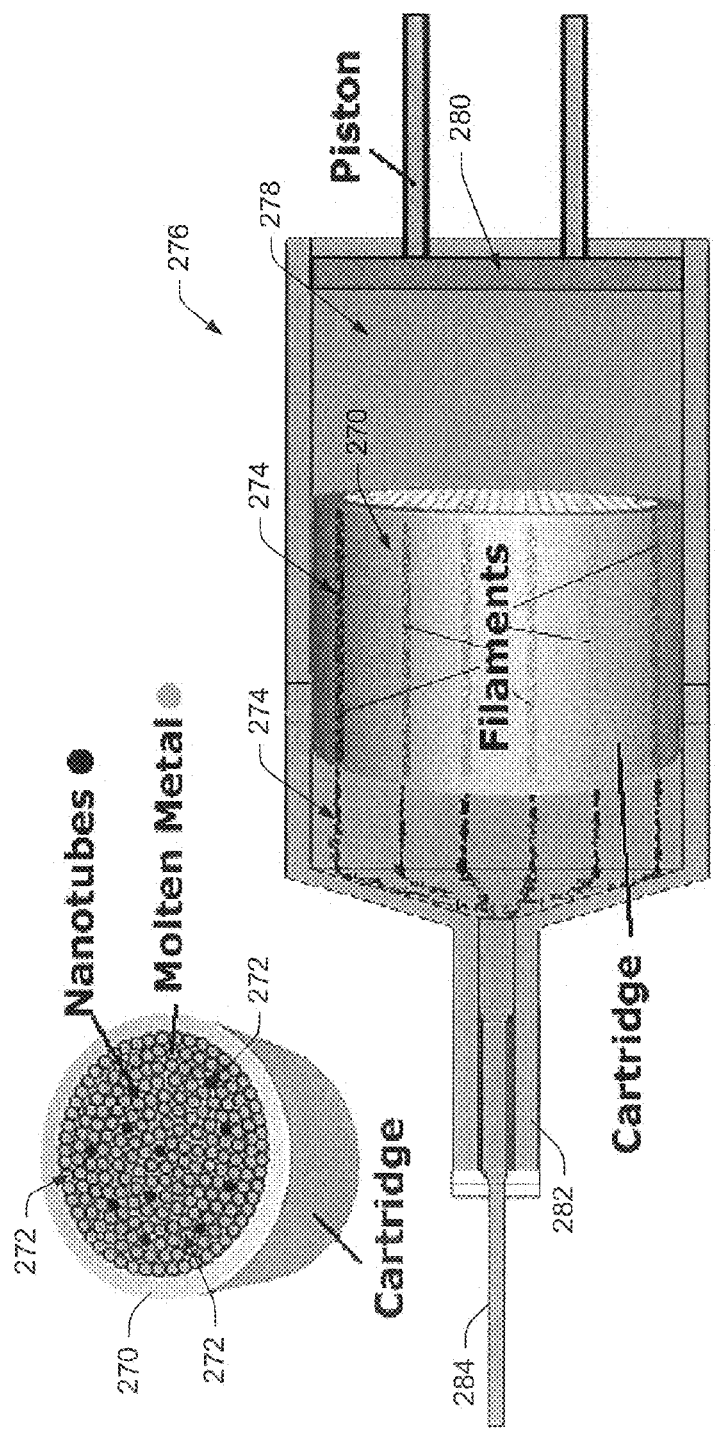
FIG. 12C illustrates a cartridge and a piston chamber into which it is inserted.

FIG. 12C illustrates a cartridge 270 such as is described with regard to the method of FIG. 11, and a piston chamber into which it is inserted. The cartridge 270 includes a plurality of channels 272 extending the length of the cartridge. One or more of the channels is prefilled with CNTs to form CNT filaments, and the remainder of channels are left empty. Once the cartridge has been preloaded with CNTs such as at 240 (FIG. 11), the cartridge is placed into the piston chamber 276, and a vacuum is created therein. Molten metal 278 then fills the chamber 276 and is permitted to permeate the empty (non-loaded) cartridge channels until all channels are filled with either CNTs or molten metal. The piston 280 forces the molten metal 278 through the cartridge 270, which in turn expels the molten metal in the cartridge as well as the CNTs in the cartridge in a uniform manner. The resultant mixture then passes through a nozzle 282 that reduces the cross-section of the molten nano-composite mixture down to a first predetermined diameter (e.g., ½ inch or some other predetermined diameter). As the reduced-diameter nano-composite mixture is expelled from the nozzle and injected into the die, it is cooled to form a nano-composite bar 284.

Figure 13:
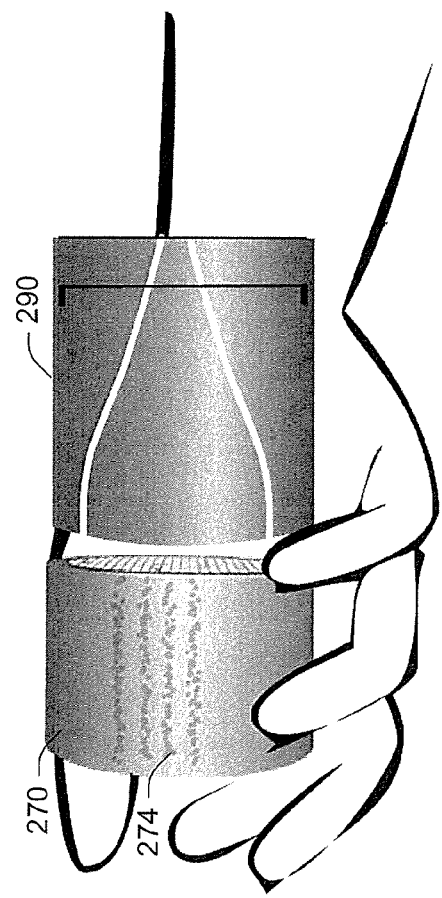
FIG. 13 is an illustration of the preloaded cartridge, which has been loaded with CNTs in a plurality of the cartridge channels to form CNT filament precursors.

FIG. 13 is an illustration of the preloaded cartridge 270, which has been loaded with CNTs in a plurality of the cartridge channels to form CNT filament precursors 274. Also shown is the nozzle 290, which is inserted into the piston chamber after (i.e. downstream of) the cartridge. The nozzle focuses nano-composite mixture expelled from the cartridge to reduce a cross-section of the nano-composite mixture prior to injecting into the die and cooling to form nano-composite bars or rods.

Figure 14:
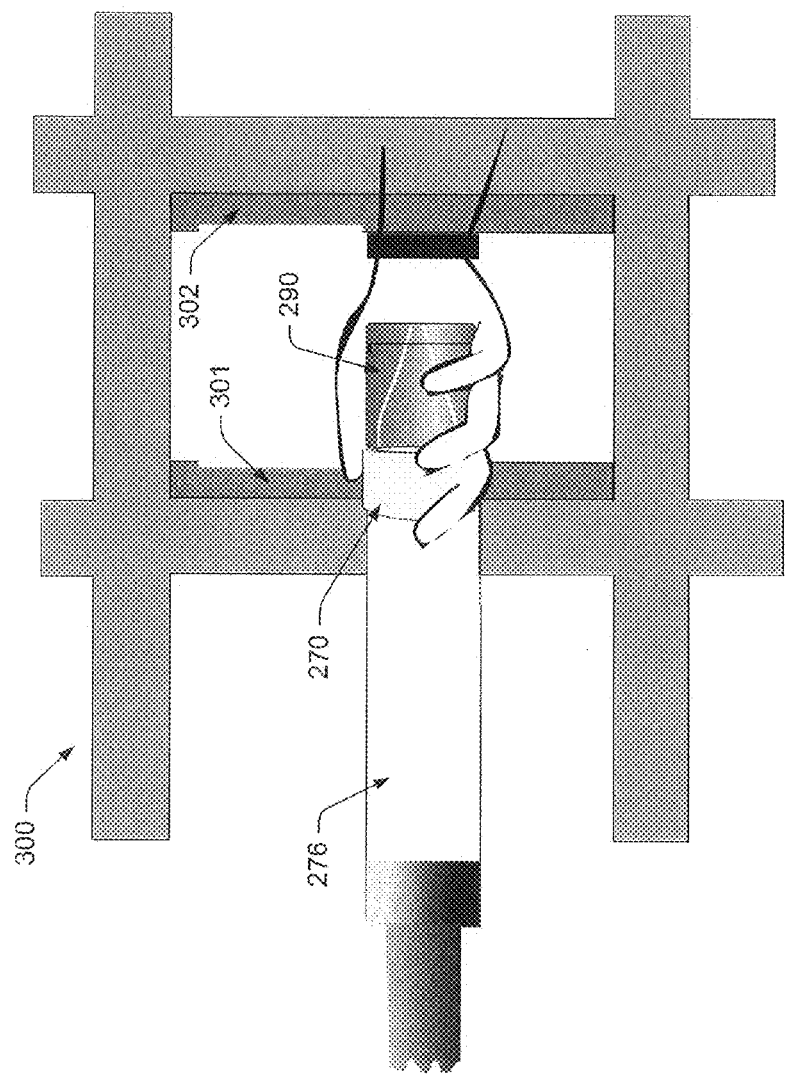
FIG. 14 illustrates a schematic die casting system or machine in which the described methods are performed.

FIG. 14 illustrates a schematic die casting system or machine 300 in which the described methods are performed. For instance, the system 300 includes the cartridge 270, which is inserted into the piston chamber 276 along with the nozzle 290. The system also includes die portions 301 and 302 that, when closed, form a die cavity (FIG. 15) into which nano-composite mixture is injected. The die-casted mixture is then cooled to form the described nano-composite bars or rods.

Figure 15:
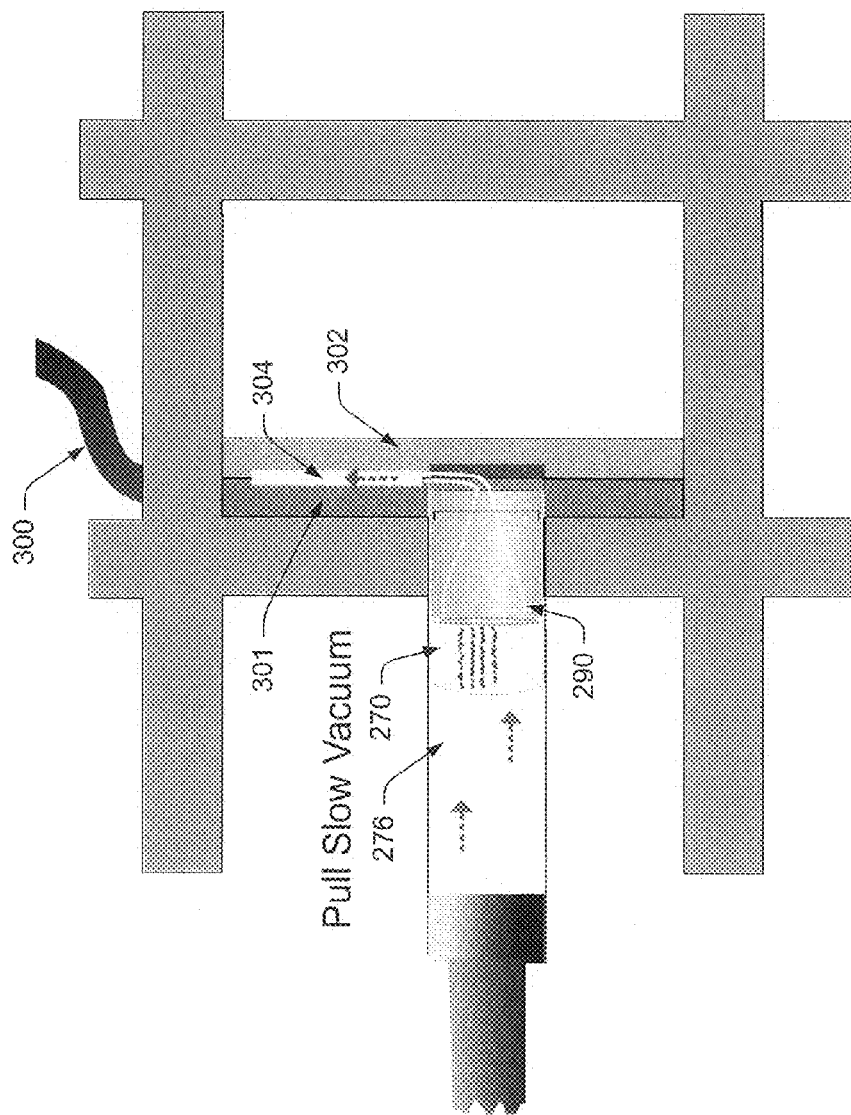
FIG. 15 illustrates a schematic of the die casting system or machine in which the described methods are performed.

FIG. 15 illustrates a schematic of the die casting system or machine 300 in which the described methods are performed. For instance, the system 300 includes the cartridge 270, which is inserted into the piston chamber 276 along with the nozzle 290. The system also includes die portions 301 and 302 that are closed to form a die cavity 304 into which nano-composite mixture will be injected. Additionally, the system includes a vacuum hose 310 that is removably coupled to the die cavity 304 to create a sustainable vacuum in the die cavity 304 and piston chamber 276. That is, the vacuum hose 310 applies negative pressure (indicated by the direction of the dashed arrows) and suctions air out of the piston chamber through the empty cavities in the cartridge, and out through the die cavity 304. Once the vacuum is created in the piston chamber and die cavity, the piston chamber can be filled with molten metal (e.g., copper or any other suitable metal).

Figure 16:
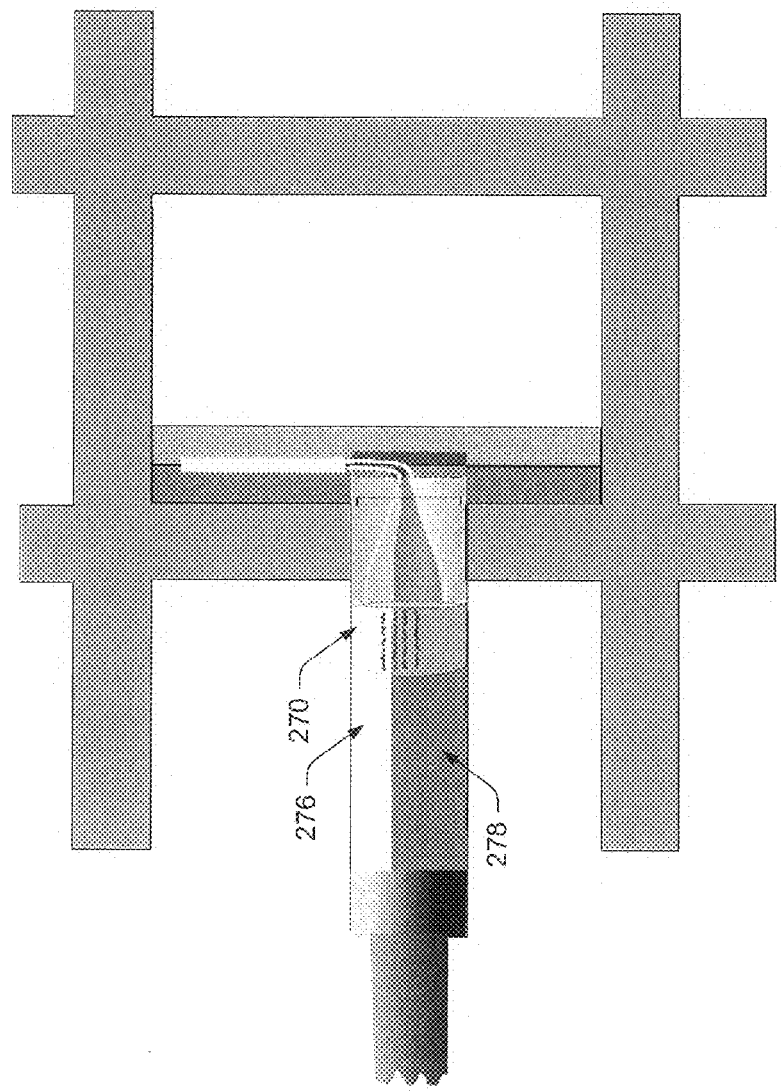
FIG. 16 illustrates a schematic of the die casting system or machine in which the piston chamber is partially filled with molten metal.

FIG. 16 illustrates a schematic of the die casting system or machine 300 in which the piston chamber 276 is partially filled with molten metal 278. The chamber is filled slowly and the molten metal is permitted to seep into the empty channels in the cartridge 270.

Figure 17:
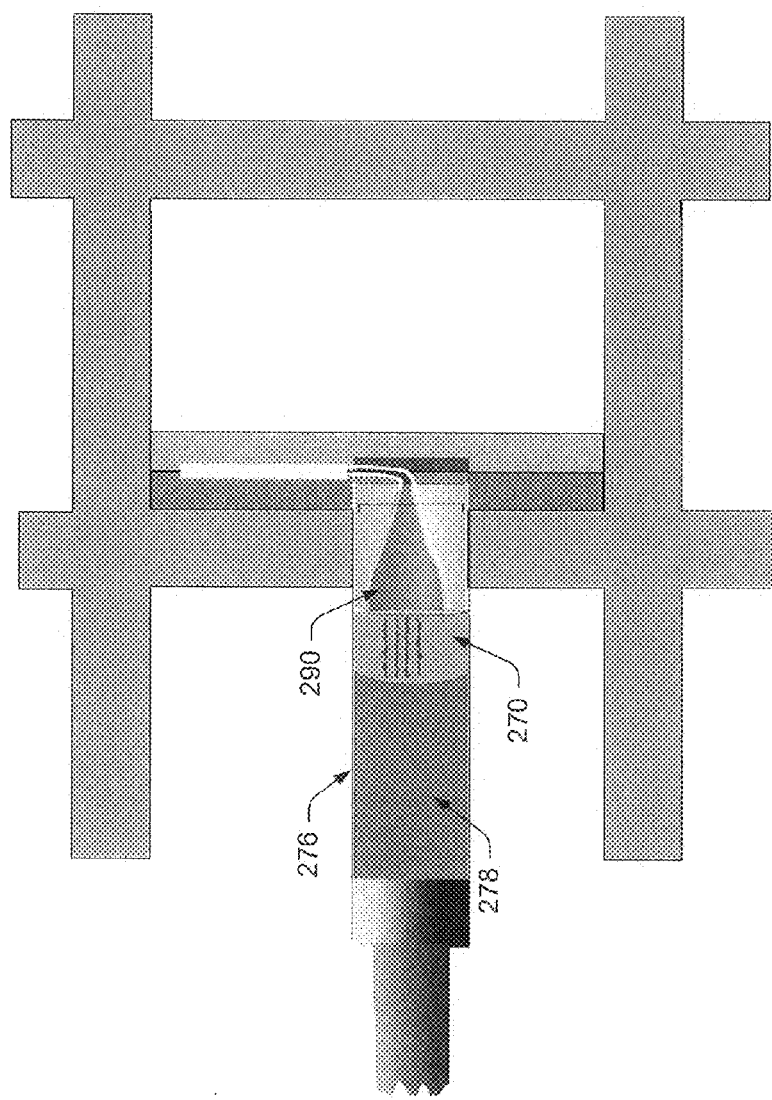
FIG. 17 illustrates a schematic of the die casting system or machine in which the piston chamber is filled with the molten metal.

FIG. 17 illustrates a schematic of the die casting system or machine 300 in which the piston chamber 276 is filled with the molten metal 278. The cartridge 270 is permitted to soak for a predetermined time period in molten metal to permit the molten metal to seep into the empty channels in the cartridge. Once the metal has permeated the empty channels in the cartridge, it also fills the nozzle 290.

Figure 18:
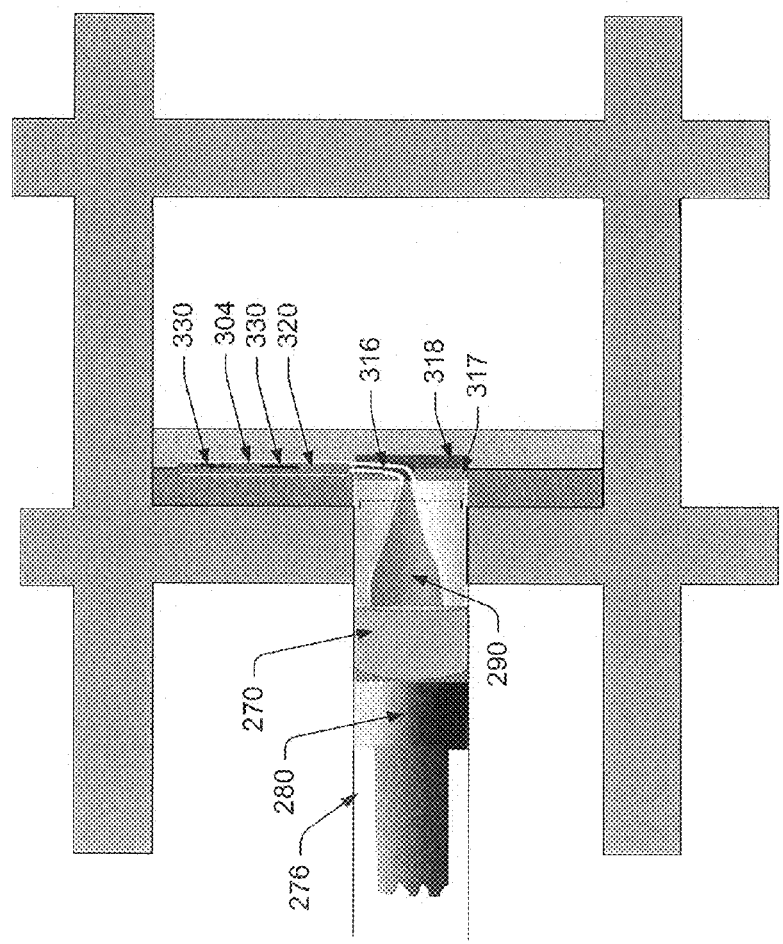
FIG. 18 illustrates a schematic of the die casting system or machine in which the piston has exerted force on the molten metal in the piston chamber to cause nano-composite material (CNTs and molten metal) in respective channels of the cartridge to be injected through the nozzle into the die cavity.

FIG. 18 illustrates a schematic of the die casting system or machine 300 in which the piston 280 has exerted force on the molten metal 278 in the piston chamber 276 to cause material (CNTs and molten metal) in respective channels of the cartridge 270 to be injected through the nozzle 290 into the die cavity 304. As the nano-composite CNT-and-molten metal material or mixture is forced through the nozzle, its cross-section is reduced to a predetermined diameter (e.g., ½ inch or some other predetermined diameter), while retaining a relative spacing between CNT filaments in the nano-composite matrix. As the reduced nano-composite mixture exits the nozzle, it passes through an injection channel 316 formed by injection portions 317, 318 in respective die portions 301, 302, and into the die cavity 304, where it is cooled to form a solid nano-composite bar or rod 320 that includes reduced cross-section CNT filaments 330.

In one embodiment, the cartridge 270 and nozzle 290 are coupled to each other. Additionally, the nozzle is reversibly coupled to the injection portion 318 of the die portion 302.

Figure 19:
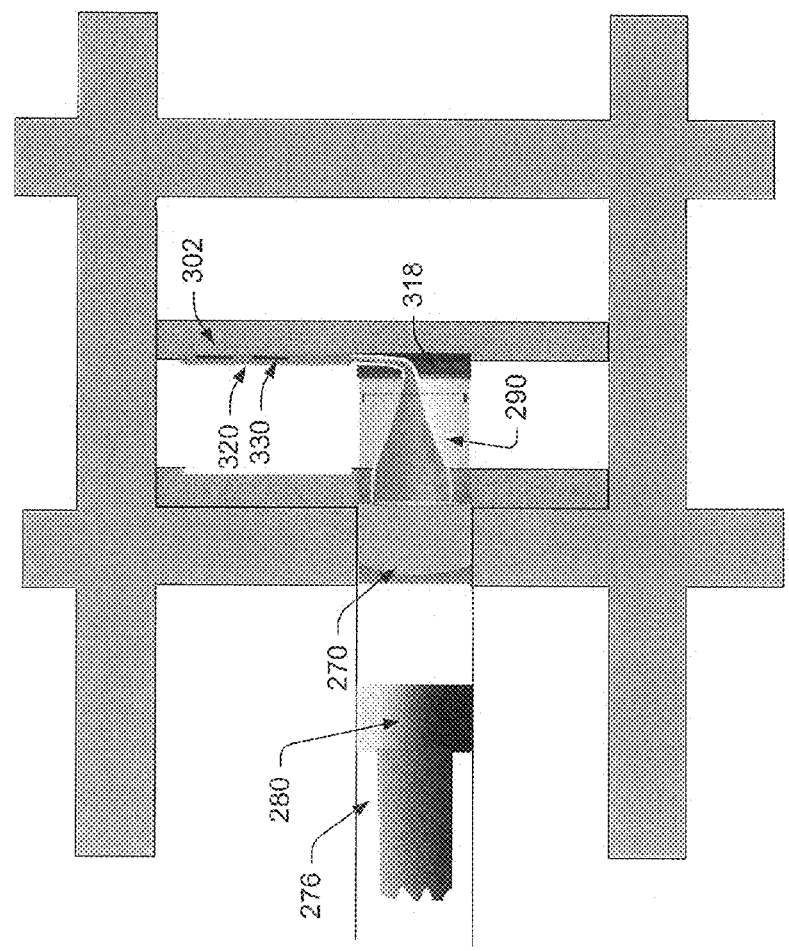
FIG. 19 illustrates a schematic of the die casting system or machine in which the piston has exerted force on the molten metal in the piston chamber and the cartridge is spent.

FIG. 19 illustrates a schematic of the die casting system or machine 300 in which the piston 280 has exerted force on the molten metal in the piston chamber 276 and the cartridge is spent (i.e., the nano-composite material has been injected into the die chamber and cooled). At this point, the die is opened (i.e., die portion 302 is pulled away from die portion 301), and the cartridge assembly comprising the nozzle 290 and cartridge 270 is pulled out of the piston chamber 276 via the reversible coupling of the nozzle 290 to the injection portion 318. The nano-composite rod 320, with the reduced cross-section CNT filaments 330, is ready for extraction from the die cavity.

Figure 20:
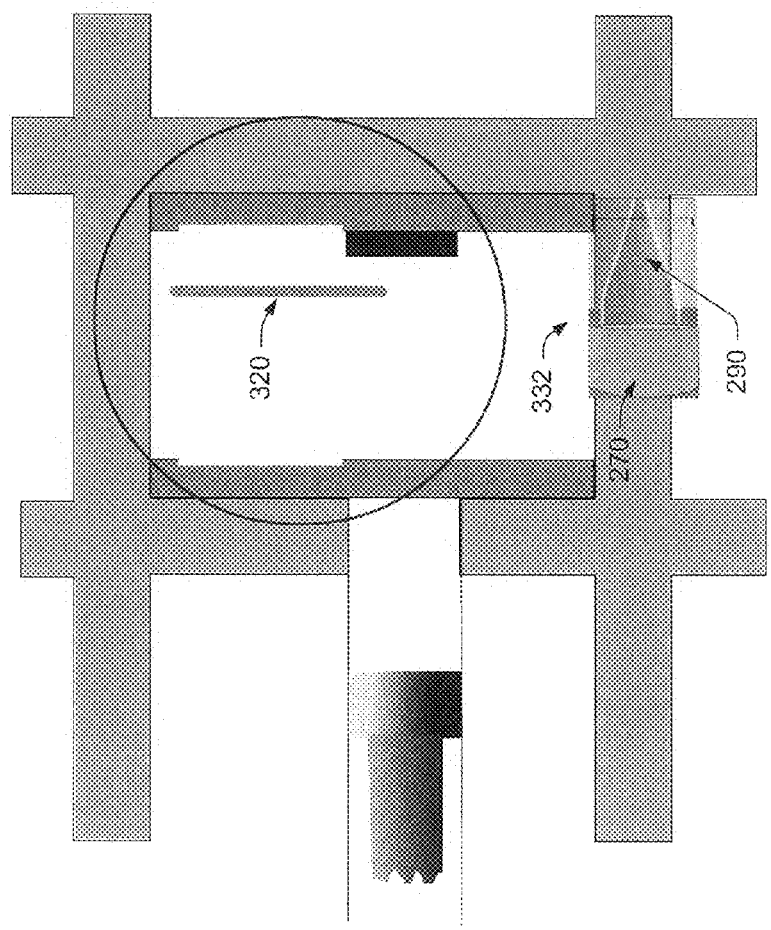
FIG. 20 illustrates a schematic of the die casting system or machine in which nano-composite rod is removed from the die.

FIG. 20 illustrates a schematic of the die casting system or machine 300 in which nano-composite rod 320 is removed from the die. Additionally, the cartridge assembly 332 comprising the cartridge 270 and nozzle 290 has fallen away or been ejected for disposal or reuse.

Figure 21:
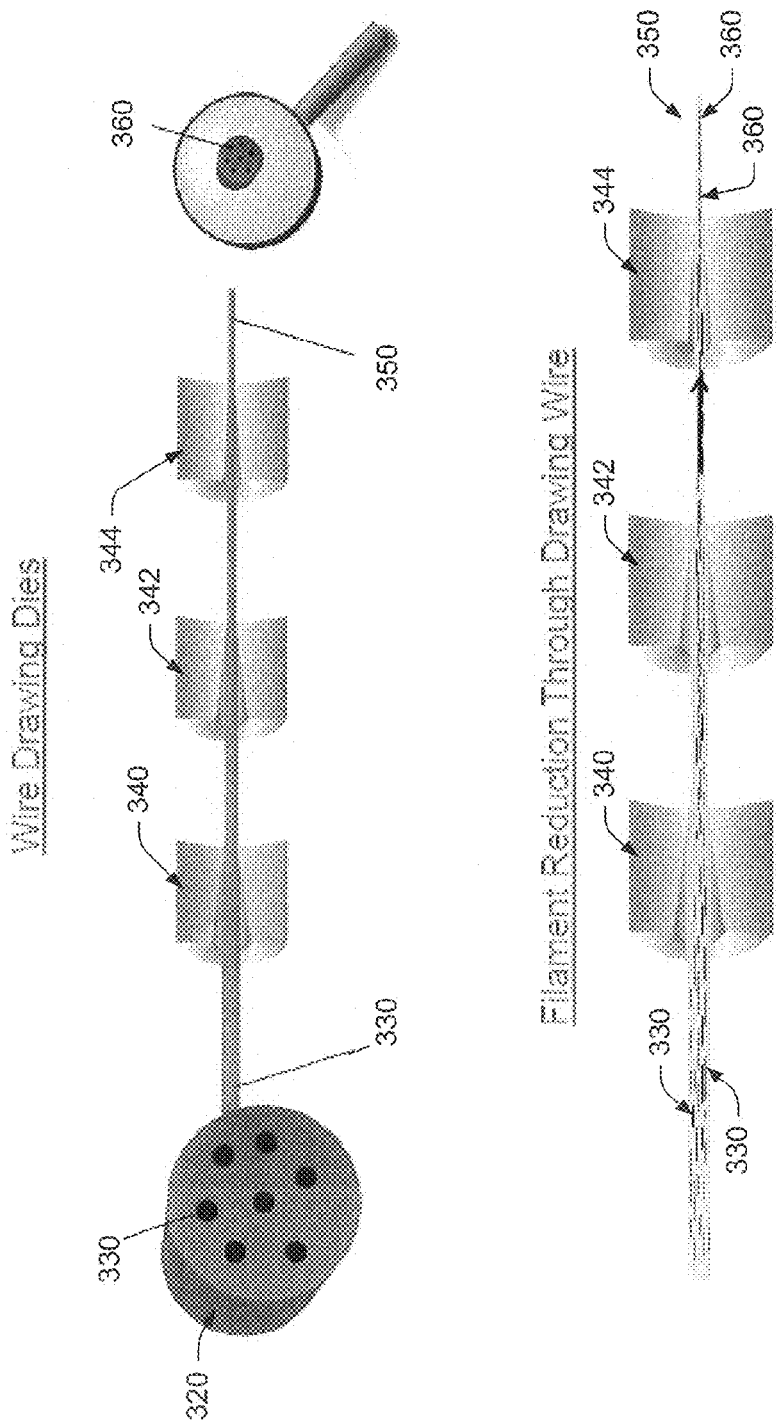
FIG. 21 a process of refining the CNT filaments by drawing down the nano-composite bar or rod comprising the reduced CNT filaments through a series of successively smaller drawing dies.

FIG. 21 a process of refining CNT filaments by drawing down the nano-composite bar or rod 320 comprising the reduced cross-section CNT filaments 330 through a series of successively smaller drawing dies 340, 342, 344. Although FIG. 21 illustrates three drawing dies, it will be understood that any number of drawing dies may be employed to draw a nano-composite wire 350 of a desired diameter form the nano-composite bar or rod 320 of a predetermined diameter. Once drawn, the nano-composite wire includes refined CNT filaments 360 of a predetermined diameter. In one example, the initial die cast nano-composite rod 320 includes reduced cross-section CNT filaments 330 of approximately 1 mm-2 mm. Once the rod 320 is run through the drawing dies, the wire diameter is reduced to approximately 0.1 mm to 0.5 mm diameter, and the refined CNT filaments 360 have a diameter on the order of 10-100 μm. Thus, additional filament reduction is achieved. That is, the cross-sections of the CNT filaments 274 (FIG. 12) initially loaded into the cartridge are reduced and drawn down as they are forced with molten metal through the nozzle 290 (FIG. 18) to form reduced CNT filaments 330 (FIG. 19), which are further refined by drawing wire from the nano-composite rods 320 to form the refined CNT filaments 360. That is, the cross-sections of the CNT filaments are further reduced as the wire is drawn from the nano-composite rods.

Figure 22:
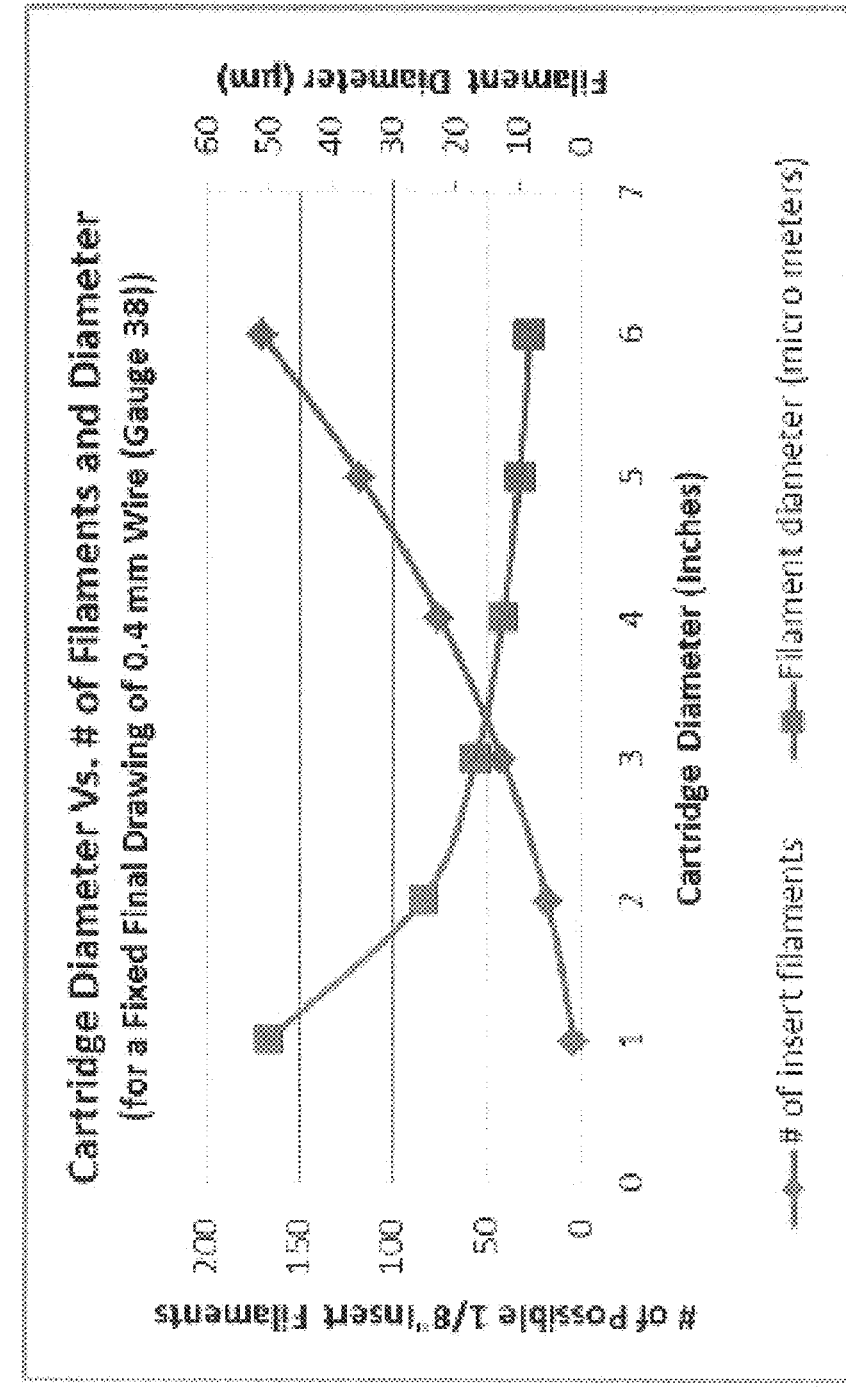
FIG. 22 is a graph of cartridge diameter as a function of cartridge channel number and refined filament diameter for a drawn nano-composite wire of a given diameter.

FIG. 22 is a graph 370 of cartridge diameter as a function of cartridge channel number (e.g., number of possible insert filaments) and refined filament diameter for a 0.4 mm drawn nano-composite wire. It will be appreciated that although the illustrated example relates to ⅛ inch cartridge channels and insert filaments, and to 0.4 mm drawn wire, any suitable channel and/or drawn wire diameters may be employed. The illustrated graph 370 shows that refined CNT filament diameter decreases as cartridge diameter increases and cartridge channel number increases.

Figure 23:
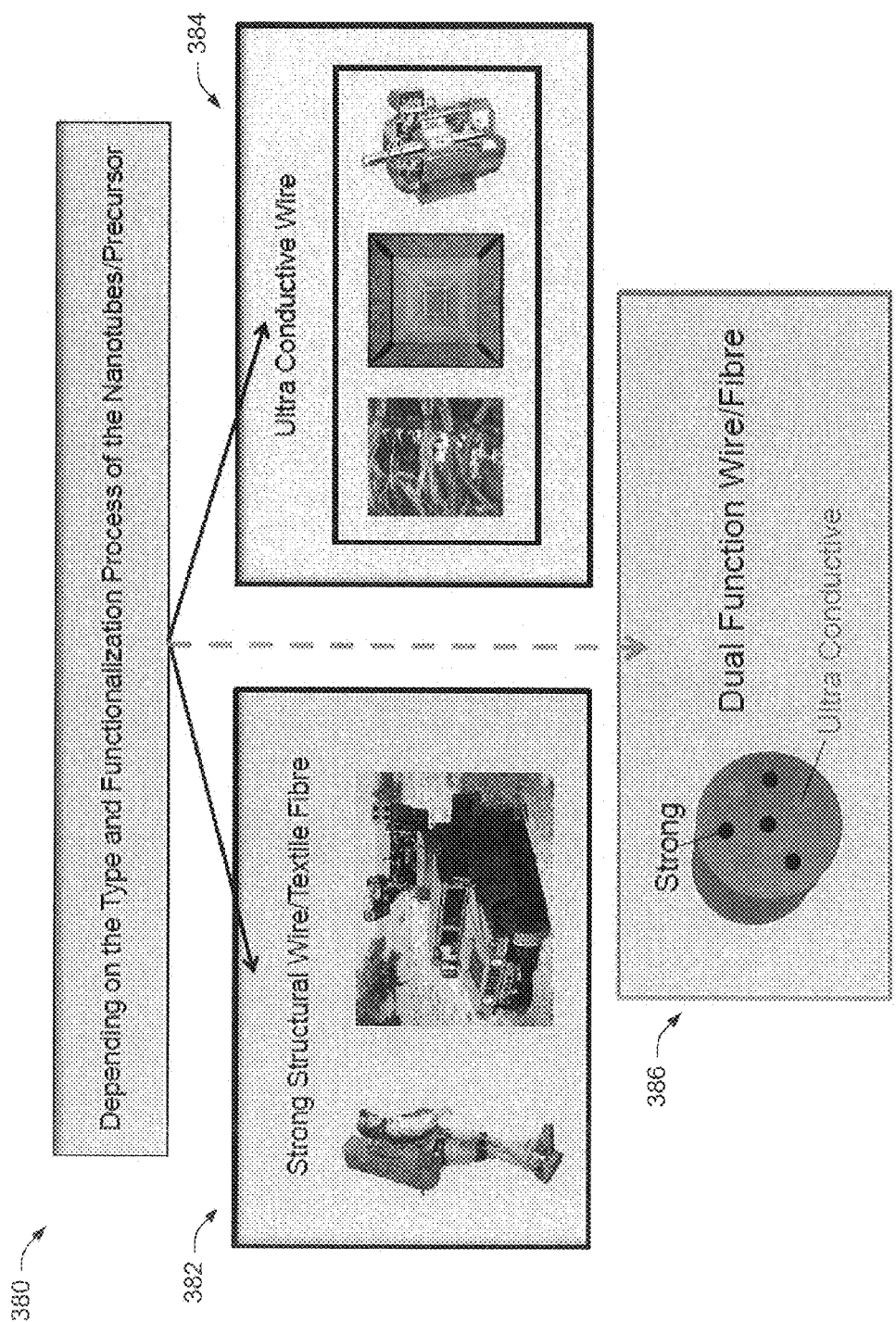
FIG. 23 illustrates a diagram representing various types of nano-composite wire or material applications, which can be achieved by manipulating the CNTs initially preloaded into the cartridge.

FIG. 23 illustrates a diagram 380 representing various types of nano-composite wire or material applications, which can be achieved by manipulating the CNTs initially preloaded into the cartridge. For example, depending on the type and functionalization or size of the CNT precursor loaded into the cartridge, the final nano-composite product can be designed for specific tensile and/or conductive properties. That is, if relatively long CNTs (e.g., 100-300 μm or so) are loaded into the cartridge, then wire strength is increased as shown at 382. In one embodiment, the relatively long CNTs are pre-cured at a temperature that enhances their mechanical properties (e.g., 1500° C. or the like). If relatively shorter CNTs (e.g., 10-15 μm or so) are loaded into the cartridge, then the wire conductivity is improved as shown at 384. In one embodiment, the relatively short CNTs are pre-cured at a temperature that enhances their transport properties (e.g., 3000° C. or the like). If both long and short CNTs are loaded into different channels in the cartridge, then a wire having increased conductivity and increased structural strength can be achieved, as shown at 386.

Figure 24:
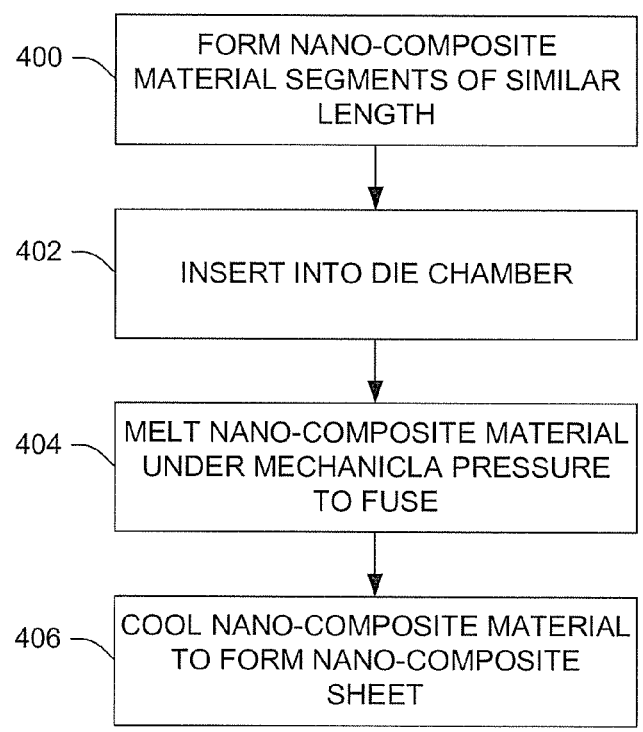
FIG. 24 illustrates a method of forming nano-composite sheets or panels in conjunction with the herein described aspects.

FIG. 24 illustrates a method of forming nano-composite sheets or panels in conjunction with the herein described aspects. At 400, nano-composite material segments of similar or identical lengths are formed. In another embodiment, the described nano-composite wire 350 is cut into uniform lengths. For instance, the nano-composite wire 350 can be wound around a spool having a circumference equal to a desired segment length. Once a sufficient length of wire has been wound to generate a desired number of segments of a desired length, the wire can be out along the length of the spool to concurrently generate the desired number of segments of the given length. In another embodiment, the wound spool of nano-composite wire is left uncut and is melted under confining mechanical pressure to form nano composite rings.

In another embodiment, the nano-composite segments are comprised of wire and inserted into a die chamber at 402. The segments fill the die chamber and the chamber is sealed. The segments are then heated to at least a melting temperature of the metal used to form the nano-composite rods and/or wires, at 404. Mechanical pressure applied by the die (e.g., by gravity, pistons, or other suitable sources of mechanical pressure) the molten nano-composite material is not permitted to flow in any direction, thereby maintaining a parallel orientation of the reduced and/or refined CNTs in the nano-composite material while fusing the wire together into a continuous sheet. The molten nano-composite material is cooled, at 406, to form a solid sheet, which may be on the order of microns to centimeters, depending on a desired functionality of the sheet. Strength and conductive properties of the nano-composite sheet can also be manipulated by using nano-composite rods or wires formed using different lengths of CNTs, such as is described with regard to FIG. 23.

Figure 25:
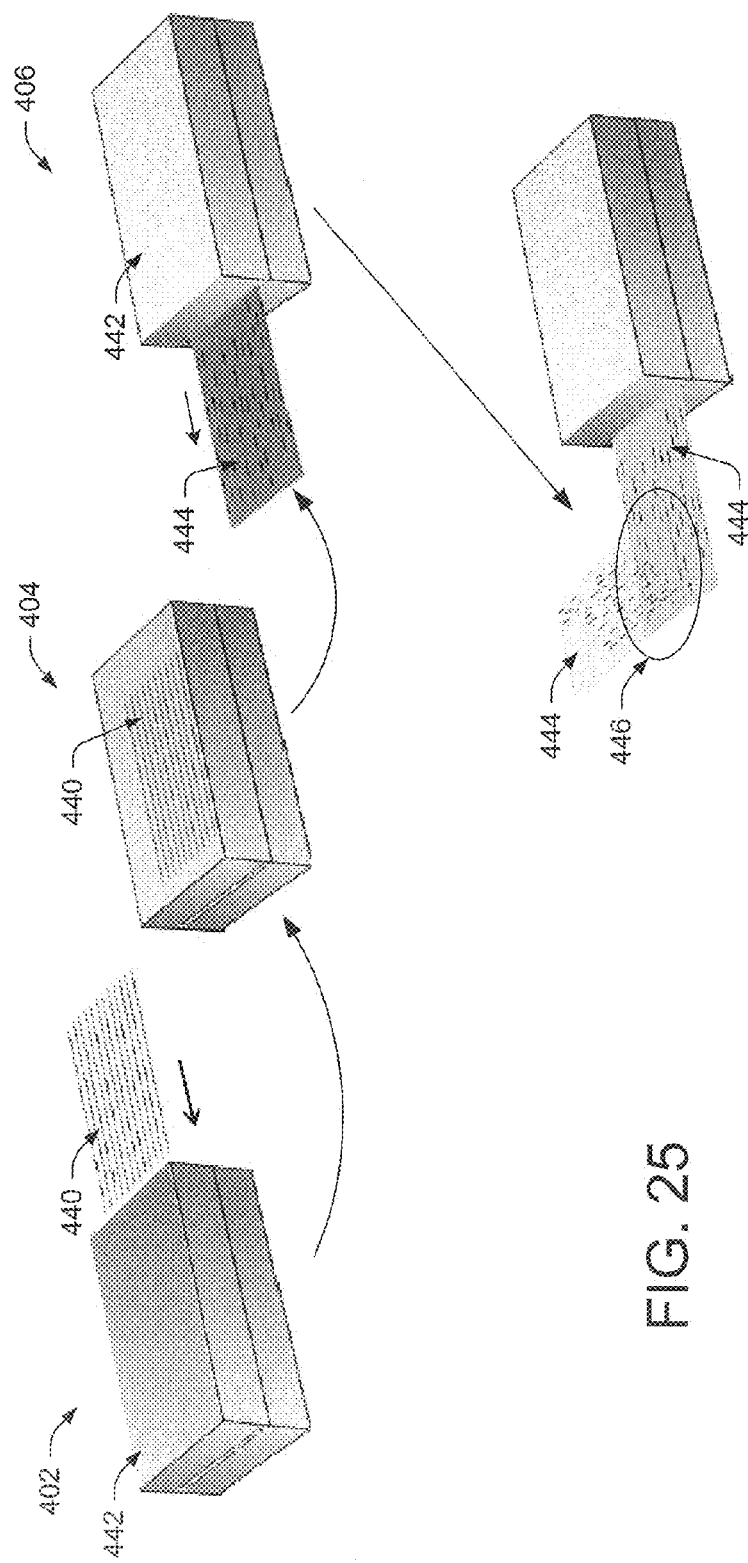
FIG. 25 illustrates a series of steps for forming nano-composite sheets, in accordance with various aspects set forth herein.

FIG. 25 illustrates a series of steps for forming nano-composite sheets as described with regard to FIG. 24, in accordance with various aspects set forth herein. Nano-composite segments 440 are inserted into a die chamber 442, such as is described at 402 of FIG. 24. The nano-composite segments 440 are heated, such as is described at 404 of FIG. 24. The molten nano-composite material is cooled and a nano-composite sheet 444 is removed from the die chamber 442, such as is described at 406 of FIG. 24. Additionally, multiple nano-composite sheets 444 can be employed to form nano-composite laminate structures or materials 446. Although depicted in FIG. 25 as being orthogonal or perpendicular to each other in the laminate structure 446 of FIG. 25, it will be understood that any desired sheet orientation may be employed when forming the described laminate structure(s) 440.

Figure 26:
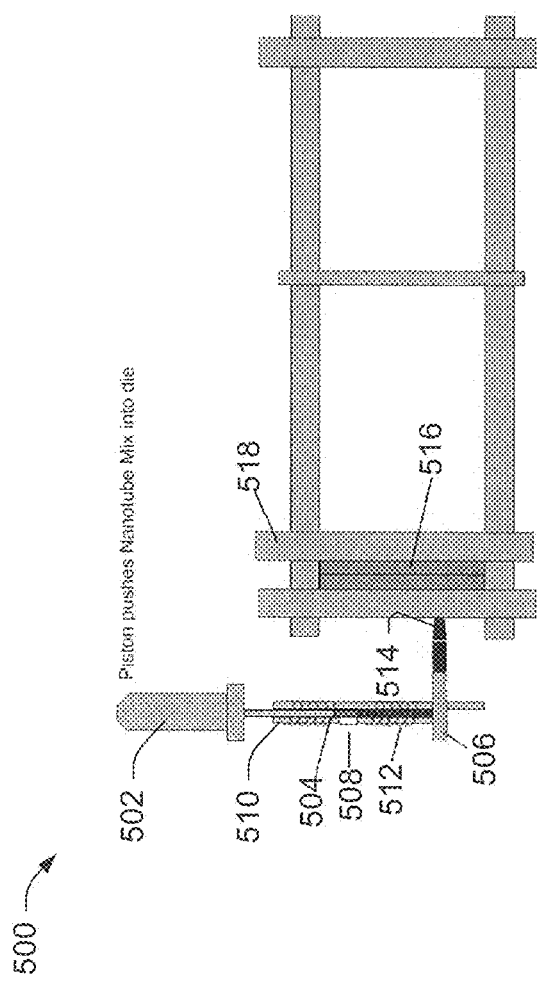
FIG. 26 illustrates a system that facilitates injecting CNT material into molten metal to form nano-composite bars or rods that can be drawn down into wire of a desired diameter.

FIG. 26 illustrates a system 500 that facilitates injecting CNT material into molten metal to form nano-composite bars or rods that can be drawn down into wire of a desired diameter. A piston 502 forces CNT material 504 into molten metal stream 506. The CNT material is loaded through a breach 508 into a piston chamber 510 that is heated by a coil 512. The nano-composite mixture is subjected to turbulent flow to mix the CNTs into the molten metal, followed by laminar flow to align the CNTs in the molten metal. The nano-composite mixture is then forced through a nozzle 514 into a die 516 where the mixture is cooled to form a nano-composite bar or rod having CNTs aligned along a longitudinal axis through the rod. One portion of the die 516 is mounted to a moving platen 518 that permits the die to be opened (i.e., to remove a nano-composite bar) and closed (i.e., for nano-composite mixture injection).

Figure 27:
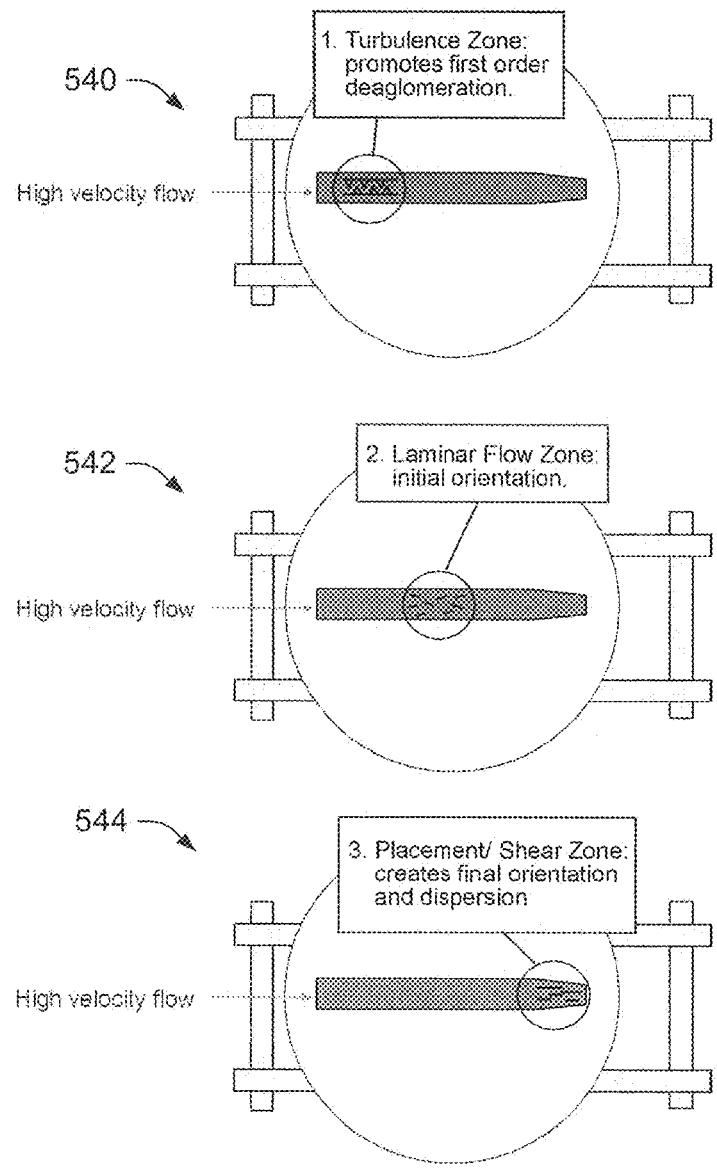
FIG. 27 illustrates a series of different flow zones through which the nano-composite mixture flows.

FIG. 27 illustrates a series of different flow zones through which the nano-composite mixture flows. At 540, the nano-composite mixture flows through a turbulent zone, where turbulent flow breaks up CNT agglomerations and disperses the CNTs in the molten metal. At 542, the nano-composite mixture flows through a laminar flow zone, where laminar flow aligns the CNTs in the molten metal. At 544, the nano-composite mixture flows through a shear zone (i.e., a nozzle), where shear forces provide a final alignment of the CNTs in the molten metal. The mixture is then injected into a die cavity and cooled to form nano-composite bars that are drawn down into nano-composite wire of a desired thickness.

Figure 28:
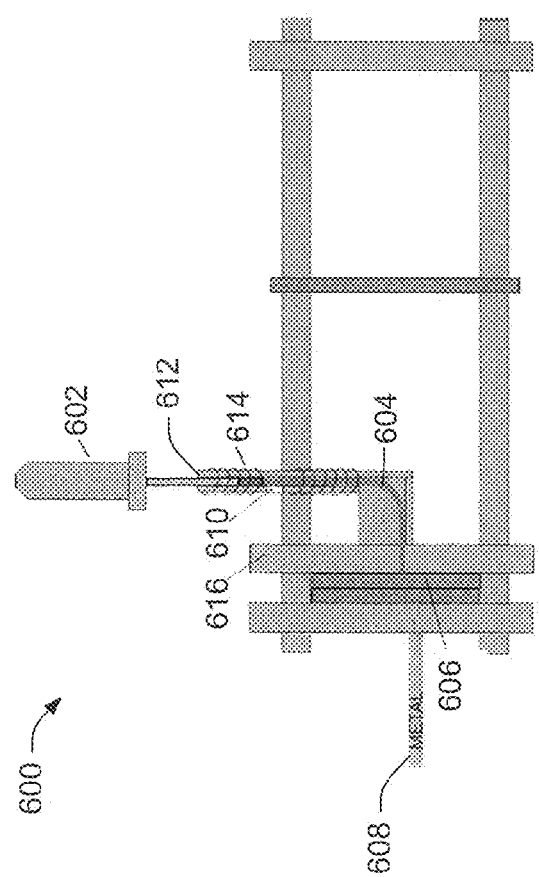
FIG. 28 illustrates a top view of a system that facilitates injecting CNT material into molten metal to form nano-composite bars or rods that can be drawn down into wire of a desired diameter.

FIG. 28 illustrates a top view of a system 600 that facilitates injecting CNT material into molten metal to form nano-composite bars or rods that can be drawn down into wire of a desired thickness. A piston 600 forces CNT material 604 into a die 606 where it is mixed with a molten metal stream 608. The CNT material is loaded through a breach 610 into a piston chamber 612 that is heated by a coil 614. The mixture is cooled to form a nano-composite bar or rod having CNTs embedded therein. One portion of the die 606 is mounted to a moving platen 616 that permits the die to be opened (i.e., to remove a nano-composite bar) and closed (i.e., for nano-composite mixture injection).

Figure 29:
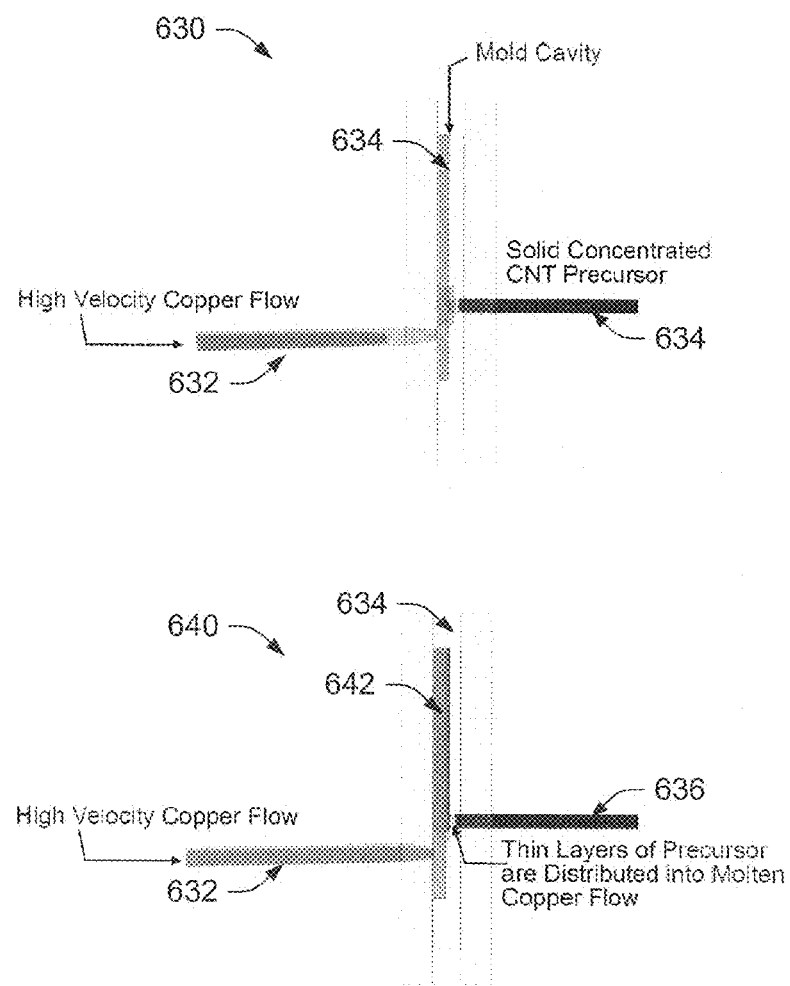
FIG. 29 illustrates examples of flow patterns into the die cavity.

FIG. 29 illustrates examples of flow patterns into the die cavity. At 630, molten metal 632 is ready to be pumped into the die mold cavity 634 at high velocity. Additionally, a solid concentrated CNT precursor 636 is arranged downstream of the molten metal entry point. At 640, the molten metal 632 is injected into the die cavity 634. Force is applied to the compacted CNT precursor 636 to force the precursor into the die cavity. As the molten metal passes the CNT precursor at high velocity, CNTs are sheared off into the molten metal to form a nano-composite mixture 642. The mixture is then cooled to form a nano-composite bar or rod that is drawn out into nano-composite wire.

Figure 30:
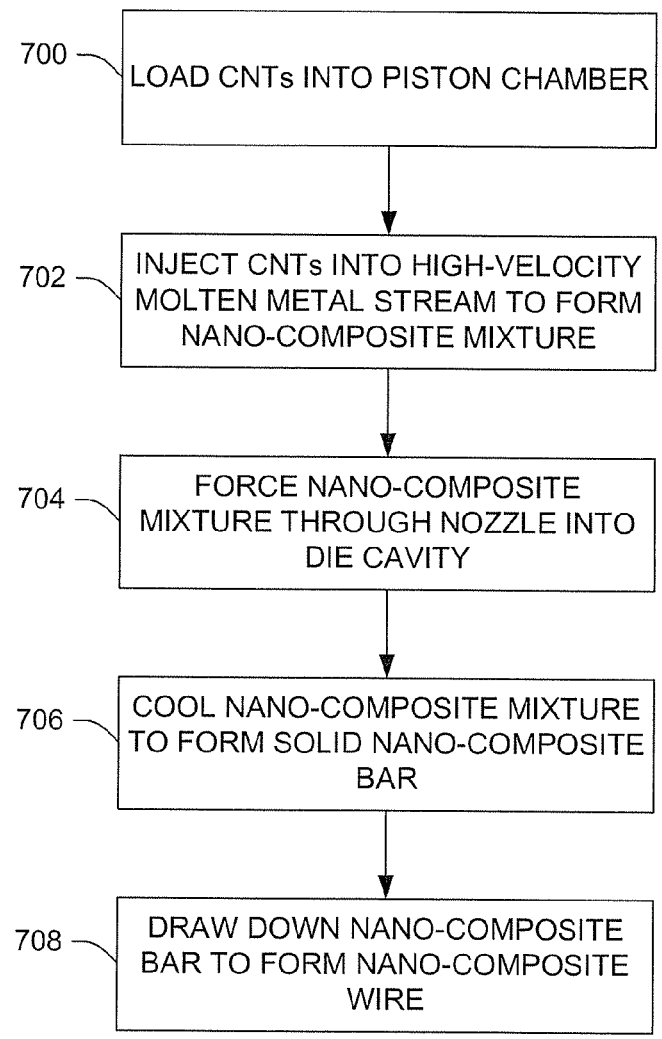
FIG. 30 illustrates a method of forming nano-composite wire.

FIG. 30 illustrates a method of forming nano-composite wire. At 700, a piston chamber is loaded with a carbon nanotube (CNT) precursor or material. At 702, the CNT precursor is injected into a molten metal stream that is under pressure and traveling at high velocity into a die cavity to form a nano-composite mixture. At 704, the nano-composite mixture is forced through a nozzle and into the die cavity. At 706, the nano-composite mixture is cooled to form a solid nano-composite bar having a first predetermined diameter, wherein the carbon nanotubes are aligned in a non-random manner in the nano-composite bar. The nano-composite bar is then drawn down to a second predetermined diameter to form nano-composite wire having CNTs aligned therein along a longitudinal axis there through. The nano-composite mixture experiences turbulent flow that mixes the CNT precursor material into the molten metal followed by laminar flow that aligns CNT filaments with each other. The nozzle exerts shear forces on the nano-composite mixture to further align the CNT filaments in the molten metal as it is injected into the die cavity.

Figure 31:
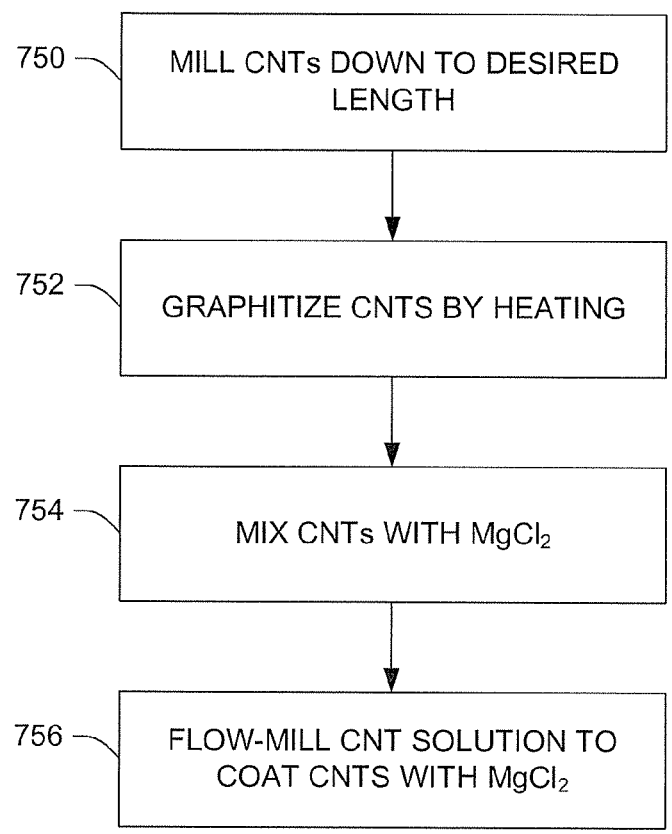
FIG. 31 illustrates a method of precursor CNT formation, in accordance with various aspects described herein.

FIG. 31 illustrates a method of precursor CNT formation, in accordance with various aspects described herein. At 750, commercial type CNTs (e.g., having a diameter of approximately 100-200 nm) are ball milled to break the CNTs down from a typical length of approximately 200 µm-300 µm to a desired length (e.g., 10 µm-15 µm). At 752, the shortened CNTs are graphitized at a predetermined temperature (e.g., 3000° C.). At 754, the graphitized CNTs are ultrasonically mixed with $MgCl_2$ solution (e.g., using a variable ratio of MWCNTs and $MgCl_2$ depending on a desired concentration). At 756, the mixture is flow-milled to breakup agglomerations and coat the CNTs with $MgCl_2$ (e.g., for 1000 cycles or more, or some other predetermined number of cycles). The coated CNTs are ready for use in forming a nano-composite mixture as described with regard to various aspects herein.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of forming nano-composite copper wire, comprising:
   pre-loading carbon nanotubes into at least one of a plurality of channels running a length of a cartridge;
   placing the pre-loaded cartridge in a piston chamber of a die-casting machine;
   drawing air out of the piston chamber to create a vacuum therein;
   filling the piston chamber with molten metal and soaking the pre-loaded cartridge for a predetermined time, wherein the molten metal fills cartridge channels that are not pre-loaded with carbon nanotubes;
   applying pressure via the piston to eject the carbon nanotubes and molten metal from the cartridge channels as a nano-composite mixture and inject the nano-composite mixture into a rod-shaped die cavity through a nozzle that draws down the nano-composite mixture to a first predetermined diameter that is not greater than a diameter of the die cavity; and
   cooling the nano-composite mixture to form a solid nano-composite rod having the first predetermined diameter, wherein the carbon nanotubes are aligned in a non-random manner in the nano-composite rod.

2. The method of claim 1, further comprising drawing down the solid nano-composite rod to a second predetermined diameter to form nano-composite wire.

3. The method of claim 2, wherein the second predetermined diameter is at least 0.1 mm.

4. The method of claim 1, wherein the carbon nanotubes are multi-walled carbon nanotubes.

5. The method of claim 4, wherein the multi-walled carbon nanotubes have a diameter in the range of 75-200 nm, and a length in the range of 10-15 μm.

6. The method of claim 4, wherein the multi-walled carbon nanotubes have a diameter in the range of 75-200 nm, and a length in the range of 200-300 μm and.

7. The method of claim 4, wherein the multi-walled carbon nanotubes are pre-coated in magnesium chloride.

8. The method of claim 1, wherein the metal is 101 copper.

9. The method of claim 1, wherein the first predetermined diameter is approximately 12 mm.

10. The method according to claim 1, wherein the cartridge has a diameter in the range of 15 mm to 30 cm, and wherein the channels have a diameter in the range of 1 mm to 12 mm.

11. The method according to claim 1, wherein the channels have a diameter of approximately 3 mm.

12. The method of claim 1, wherein the cartridge is formed of a material that remains solid above a melting temperature of the molten metal.

13. The method according to claim 1, further comprising:
   sealing a plurality of parallel lengths of nano-composite wire into a die;
   melting the lengths of nano-composite wire under mechanical pressure that prevents flow of molten nano-composite material; and
   cooling the molten nano-composite material into an aggregate nano-composite structure comprising aligned carbon nanotubes.

14. The method of claim 1, wherein the die casting machine is one of a hot chamber die-casting machine or a cold chamber die-casting machine.

* * * * *